(12) United States Patent
West et al.

(10) Patent No.: US 6,762,223 B2
(45) Date of Patent: Jul. 13, 2004

(54) STABILIZED IMAGEABLE COATING COMPOSITION AND PRINTING PLATE PRECURSOR

(75) Inventors: Paul R. West, Fort Collins, CO (US); Nicki R. Miller, Fort Collins, CO (US); Jeffrey W. Leon, Rochester, NY (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 77 days.

(21) Appl. No.: 09/999,397

(22) Filed: Oct. 31, 2001

(65) Prior Publication Data

US 2003/0134936 A1 Jul. 17, 2003

(51) Int. Cl.⁷ .............................................. C08L 1/26
(52) U.S. Cl. .................... 524/44; 524/495; 524/496; 524/589; 524/559; 524/55; 524/502; 428/626; 428/461; 428/467; 523/215; 525/127
(58) Field of Search .................. 524/44, 495, 496, 524/589, 559, 55, 502; 523/215; 428/626, 461, 467; 525/127

(56) References Cited

U.S. PATENT DOCUMENTS

| | | | |
|---|---|---|---|
| 2,244,325 A | 6/1941 | Bird ........................... | 252/313 |
| 2,574,902 A | 11/1951 | Bechtold et al. ............ | 252/313 |
| 2,597,872 A | 5/1952 | Her et al. ................... | 260/29.6 |
| 4,226,754 A | 10/1980 | Yun et al. ................... | 260/29.6 |
| 4,569,965 A | 2/1986 | Engel et al. | |
| 5,312,704 A | 5/1994 | Fuller et al. ................ | 430/45 |
| 5,985,514 A | 11/1999 | Zheng et al. | |
| 6,159,657 A | 12/2000 | Fleming et al. | |
| 6,187,085 B1 | 2/2001 | Wasilewski ............... | 106/31.75 |
| 6,190,830 B1 | 2/2001 | Leon et al. ................ | 430/270.1 |
| 6,399,268 B1 | 6/2002 | Fleming et al. | |
| 6,447,978 B1 | 9/2002 | Leon et al. ................ | 430/270.1 |
| 6,451,500 B1 | 9/2002 | Leon ......................... | 430/270.1 |

FOREIGN PATENT DOCUMENTS

| | | |
|---|---|---|
| EP | 0112465 | 11/1983 |
| EP | 1046496 | 4/2000 |
| WO | 0063025 | 10/2000 |
| WO | 0139985 | 6/2001 |

OTHER PUBLICATIONS

English–language Abstract for EP 0 112 465.
J.C. Padget, "Polymers for Water–Based Coatins—A systematic Overview", J. Coat Techol., vol. 66, No. 839, Dec. 1994.

*Primary Examiner*—Rabon Sergent
*Assistant Examiner*—Melanie Bissett
(74) *Attorney, Agent, or Firm*—Faegre & Bneson, LLP

(57) ABSTRACT

The present invention relates to printing plate coating compositions comprising: (a) a carbon pigment dispersible in water; (b) at least one polymer comprising at least one ionomeric polymer subunit; and (c) at least one high molecular weight thickening agent which shows pseudoplastic behavior. The printing plate precursor of this invention is prepared by coating a printing plate substrate with the coating composition.

48 Claims, No Drawings

STABILIZED IMAGEABLE COATING COMPOSITION AND PRINTING PLATE PRECURSOR

BACKGROUND OF THE INVENTION

1. Field of the Invention

This invention is directed to a stabilized imageable coating composition useful in the preparation of printing plate precursors. More particularly, the coating composition includes ionomeric polymers useful in thermally switchable printing plates, and associative thickeners that prevent flocculation and agglomeration of aqueous carbon dispersions contained in the coating composition.

2. Background Information

Ionomeric polymers are of interest for "no-process" thermal printing plates because they provide a hydrophilic background that can be converted by IR imaging into oleophilic areas that take ink on press. However, ionomeric polymers used in thermally "switchable" printing plates cause aqueous carbon dispersions with ionic stabilization to flocculate when mixed in a coating formulation or to agglomerate during drying of the coating. Stability to flocculation results in improved optical density and is therefore desirable.

The problems encountered by the use of ionically stabilized aqueous carbon dispersions have been described in the literature. For example, WO 00/63025 discloses the use of aqueous polymer-grafted carbon dispersions as a solution to the flocculation problem. Polymer-grafted carbon is much more resistant to flocculation. However, polymer-grafted carbon can have a detrimental effect on the background sensitivity of printing plates and on blanket toning, depending upon the choice of ionomeric polymer and on the type of ink used. Polymer-grafted carbon dispersions are currently available only on an experimental basis and are expected to be expensive once commercialized.

U.S. Pat. No. 6,187,085 discloses a carbon black printing ink having Newtonian flow with improved rheological properties. However, the disclosed ink compositions are all in mineral oil, and thus could not be used in aqueous compositions. Furthermore, while the polyisobutylene succinimide used together with sodium hydroxide may form a sodium salt in situ, the resulting polymer has only an ionic terminus and thus is not an ionomer. Triethylene glycol is also required as a rheological additive.

European Patent No. 0 112 465 discloses an ink composition based on a novel alkyl binder which improves ability to de-ink paper for recycling. However, all compositions are in mineral oil, and thus incompatible with aqueous formulations. No mention is made of ionomeric polymers.

U.S. Pat. No. 5,312,704 discloses a composition of particles of pigment and a resin or blend of resins with good Theological properties. The composition is directed to use in toners. The solid toner particles disclosed in this reference are not compatible with aqueous formulations. No associative thickeners are discussed.

U.S. Pat. No. 4,569,965 discloses crotonate copolymers and their use as thickeners providing high viscosity at high shear rates in aqueous systems and as sizing agents. These copolymers are directed to use as paper printing pastes, and are not directed to uses in printing plates. Furthermore, the use of thickeners with aqueous carbon dispersions or with ionomeric polymers is not discussed.

J. C. Padget in "Polymers for water-based coatings—a systematic overview", J. Coat. Technol. Vol. 66 No. 839, pp. 89–105, December 1994, has mentioned the advantage of associative thickeners in minimizing flocculation of pigments in aqueous coatings. However, the article is directed to paint or architectural coatings, and does not address coatings for printing plates.

U.S. patent application Ser. No. 09/688402, now abandoned, discloses the use of thixotropic additives to water-soluble film-forming polymers to improve certain properties of coating compositions. However, this application does not address the stabilization of aqueous carbon dispersions, or the use of thixotropic additives with ionomeric polymers.

There is therefore a need in the art for a composition and method to increase the stability to flocculation of aqueous carbon dispersions in ionomeric polymers for coating compositions to be used to prepare printing plate precursors.

We have found that aqueous carbon dispersions with ionic surface treatments may be used in ionomeric switchable polymer coatings without the occurrence of flocculation if used in conjunction with associative thickeners. Particularly useful are rheology modifiers or polymers that exhibit pseudoplastic behavior in solution. These materials provide viscosity to stabilize the carbon particles, but undergo shear thinning to minimize coating problems. We have also found that such rheology modifiers may be used to stabilize low viscosity aqueous carbon formulations in which even polymer-grafted carbon dispersions are inadequately stable. Printing plates prepared from aqueous carbon formulations incorporating polymers that exhibit psueoplastic behavior have been found to deliver darker prints at lower exposure energies than do plates prepared without these polymeric additives, that is, the plates of the present invention have faster photospeeds.

SUMMARY OF THE INVENTION

In one aspect, the invention relates to a printing plate coating composition comprising: (a) a carbon pigment dispersible in water, (b) at least one polymer comprising at least one ionomeric polymer subunit, and (c) at least one high molecular weight thickening agent which shows pseudoplastic behavior.

In another aspect, the invention relates to a printing plate precursor comprising a coating obtainable by applying the coating composition on a suitable printing plate substrate. As used herein, the term "printing plate substrate" refers to a substrate which is capable of being mounted on a printing press for lithographic duplication or printing. The precursor may be prepared, for example, by applying the coating composition by means of a slot coater or roll coater.

The present invention is useful in the production of printing plates that make use of aqueous carbon-pigmented coatings. In particular, the invention enhances the use of coating compositions containing ionic switchable polymers with ionically stabilized aqueous carbon dispersions. The invention is also useful in that it makes practical the use of ionically stabilized commercially available aqueous carbon dispersions in aqueous ionomeric coating formulations. The invention also makes possible the coating of low viscosity aqueous formulations containing either polymer-grafted or ionically-stabilized carbon dispersions.

The present invention has the advantage that polymeric additives that provide rheological control make it possible to use relatively inexpensive, commercially available aqueous carbon dispersions in coating compositions for printing plates. In particular, the present invention makes possible the use of ionic functionalized carbon dispersions in switchable printing plates to afford improved performance in the background or non-image areas.

DETAILED DESCRIPTION OF THE INVENTION

The coating compositions according to the present invention comprise: (a) a carbon pigment dispersible in aqueous phase; (b) at least one polymer comprising at least one ionomeric polymer subunit; and (c) at least one high molecular weight thickening agent which shows pseudoplastic behavior. The molecular weight of the thickening agent is from about 50,000 to about 15 million, preferably from about 100,000 to about 15 million.

The carbon pigment can be any carbon pigment capable of being dispersed in aqueous phase. In one embodiment of the invention, the carbon pigment may form an ionically stabilized carbon dispersion comprising carbon that is functionalized with ionic groups, preferably quaternary ammonium, sulfonate or carboxylate groups. Examples of such ionically stabilized carbon dispersions include CAB-O-JET 200, CAB-O-JET 300, and CAB-O-JET IJX-144 available from Cabot Corporation. In another embodiment, the carbon pigment may form a polymer-grafted dispersion comprising carbon that is covalently bound to polymeric chains. Examples of such polymer-grafted dispersions include FX-GEW-42 and FX-GE-003 available from Nippon Shokubai. In another embodiment, the carbon pigment may form a dispersion comprising carbon and a dispersant in water. Examples of such dispersions include GA BLACK 12031 and GA BLACK 12032 available from Mikuni Color. In another embodiment, a mixture of two or all three of the carbon pigments may be used.

The polymers comprising at least one ionomeric polymer subunit useful in one embodiment of this invention comprise random recurring units comprising carboxylic or carboxylate groups. Preferably, at least some of the random recurring units comprise quaternary ammonium salts of carboxylic acids. Such polymers are described, for example, in U.S. Pat. Nos. 6,447,978 and 6,451,500 and PCT/US00/32841. The polymers generally have a molecular weight of at least 3,000 Daltons and preferably of at least 20,000 Daltons. The polymers comprising at least one ionomeric polymer subunit are capable of being readily converted from a hydrophilic material to a hydrophobic one by heating or by a heat-induced reaction. In this context it is understood that a polymer is capable of being readily converted from a hydrophilic material to a hydrophobic one provided that the activation energy $E_a$ and Arrhenius pre-exponential factor A for the thermal switching reaction simultaneously fulfill the relationships: $\ln(A) \geq 0.4\, E_a + 8.84$, and $\ln(A) \leq 1.69\, E_a - 14.37$, as described in U.S. Pat. No. 6,146,812 (herein incorporated by reference).

The polymers of this invention may also comprise Bunte salts (salts of S-alkylthiosulfuric acid).

The polymer randomly comprises one or more types of carboxylate-containing recurring units (or equivalent anhydride units) units identified as "A" below in Structure 1 and optionally one or more other recurring units (non-carboxylated) denoted as "B" in Structure 1.

The carboxylate-containing recurring units are linked directly to the polymer backbone which is derived from the "A" monomers, or are connected by optional spacer units identified as "X" in Structures 1 and 2 below. This spacer unit can be any divalent aliphatic, alicyclic or aromatic group that does not adversely affect the polymer's heat-sensitivity. For example, "X" can be a substituted or unsubstituted alkylene group having 1 to 16 carbon atoms (such as methylene, ethylene, isopropylene, n-propylene and n-butylene), a substituted or unsubstituted arylene group having 6 to 10 carbon atoms in the arylene ring (such as m- or p-phenylene and naphthylenes), substituted or unsubstituted combinations of alkylene and arylene groups (such arylenealkylene, arylenealkylenearylene and alkylenearylenealkylene groups), and substituted or unsubstituted N-containing heterocyclic groups. Any of these defined groups can be connected in a chain with one or more amino, carbonamido, oxy, thio, amido, oxycarbonyl, aminocarbonyl, alkoxycarbonyl, alkanoyloxy, alkanoylamino or alkaminocarbonyl groups. Particularly useful "X" spacers contains an ester or amide connected to an alkylene group or arylene group (as defined above), such as when the ester and amide groups are directly bonded to "A".

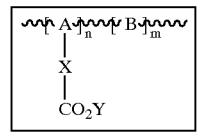

Structure 1

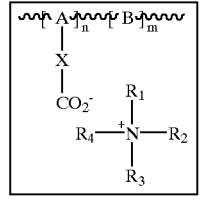

Structure 2

Additional monomers (non-carboxylate monomers) that provide the recurring units represented by "B" in Structures 1 and 2 above include any useful hydrophilic or oleophilic ethylenically unsaturated polymerizable comonomers that may provide desired physical or printing properties of the surface imaging layer of the imageable composition or which provide crosslinkable functionalities. One or more "B" monomers may be used to provide these recurring units, including but not limited to, acrylates, methacrylates, styrene and its derivatives, acrylamides, methacrylamides, olefins, vinyl halides, and any monomers (or precursor monomers) that contain carboxy groups (that are not associated with quaternary ammonium ions).

In Structure 1, Y is a proton or a cation. Preferably, Y is selected from hydrogen, lithium, sodium, potassium, rubidium, and cesium.

The quaternary ammonium carboxylate-containing polymer of Structure 2 may be chosen or derived from a variety of polymers and copolymer classes including, but not necessarily limited to polyamic acids, polyesters, polyamides, polyurethanes, silicones, proteins (such as modified gelatins), polypeptides, and polymers and copolymers based on ethylenically unsaturated polymerizable monomers such as acrylates, methacrylates, acrylamides, methacrylamides, vinyl ethers, vinyl esters, alkyl vinyl ethers, maleic acid/anhydride, itaconic acid/anhydride, styrenics, acrylonitrile, and olefins such as butadiene, isoprene, propylene, and ethylene. A parent carboxylic acid-containing polymer (that is, one reacted to form quaternary ammonium carboxylate groups) may contain more than one type of carboxylic acid-containing monomer. Certain monomers, such as maleic acid/anhydride and itaconic acid/anhydride may contain more than one carboxylic acid unit. Preferably, the parent carboxylic acid-containing polymer is an addition polymer or copolymer containing acrylic acid, methacrylic acid, maleic acid or anhydride, or itaconic acid or anhydride or a conjugate base or hydrolysis product thereof.

While Structure 2 could be interpreted to show polymers derived from only two ethylenically unsaturated polymerizable monomers, it is intended to include terpolymers and other polymers derived from more than two monomers.

The quaternary ammonium carboxylate groups must be present in the ionomeric polymers useful in this invention in such a quantity as to provide a minimum of one mole of the quaternary ammonium carboxylate groups per 1300 g of polymer, and preferably per 1000 g of polymer, and a maximum of one mole of quaternary ammonium carboxylate groups per 45 g of polymer, and preferably per 132 g of polymer. Preferably, this ratio (moles of quaternary ammonium carboxylate groups to grams of polymer) is from about 1:600 to about 1:132 and more preferably, this ratio is from about 1:500 to about 1:132, or from about 1:500 to 1:45, and more preferably from about 1:300 to 1:45. This parameter is readily determined from a knowledge of the molecular formula of a given polymer.

The quaternary ammonium counterion of the carboxylate functionalities may be any ammonium ion in which the nitrogen is covalently bound to a total of four alkyl or aryl substituents as defined below. In a preferred embodiment, at least one of the four substituents is a substituted-alkylene ($C_1$–$C_3$)-phenyl group.

More particularly, in Structure 2 noted above, $R_1$, $R_2$, $R_3$ and $R_4$ are independently substituted or unsubstituted alkyl groups having 1 to 12 carbon atoms (such as methyl, ethyl, n-propyl, isopropyl, t-butyl, hexyl, hydroxyethyl, 2-propanonyl, ethoxycarbonylmethyl, benzyl, substituted benzyl (such as 4-methoxybenzyl, o-bromobenzyl, and p-trifluoromethylbenzyl), and cyanoalkyl), or substituted or unsubstituted aryl groups having 6 to 14 carbon atoms in the carbocyclic ring (such as phenyl, naphthyl, xylyl, p-methoxyphenyl, p-methylphenyl, m-methoxyphenyl, p-chlorophenyl, p-methylthiophenyl, p-N,N-dimethylaminophenyl, methoxycarbonylphenyl and cyanophenyl). Alternatively, any two, three or four of $R_1$, $R_2$, $R_3$ and $R_4$ can be combined to form a ring (or two rings for four substituents) with the quaternary nitrogen atom, the ring having 5 to 14 carbon, oxygen, sulfur and nitrogen atoms in the ring. Such rings include, but are not limited to, morpholine, piperidine, pyrrolidine, carbazole, indoline and isoindoline rings. The nitrogen atom can also be located at the tertiary position of the fused ring. Other useful substituents for these various groups would be readily apparent to one skilled in the art, and any combinations of the expressly described substituents are also contemplated.

Preferably, at least one of $R_1$, $R_2$, $R_3$ and $R_4$ is a substituted-alkylene ($C_1$–$C_3$)-phenyl group. Any two or all three of the remaining substituents may be combined to form a ring or rings as described above.

Alternatively, multi-cationic ionic species containing more than one quaternary ammonium unit covalently bonded together and having charges greater than +1 (for example +2 for diammonium ions, and +3 for triammonium ions) may be used in this invention.

Preferably, the nitrogen of the quaternary ammonium ion is directly bonded to one or more benzyl groups or one or two phenyl groups. Alternatively, the nitrogen atom is part of one or two five-membered rings, or one or two indoline or isoindoline rings and has a molecular weight of less than 400 Daltons.

The use of a spiro ammonium cation in which the nitrogen lies at the vertex of two intersecting rings is especially preferred. When a carboxylate polymer containing such an ammonium counterion is thermally imaged, small molecule amines are not given off and hence the problem of odor during imaging is alleviated. Similarly, the use of a benzyl-tris-hydroxyethyl ammonium ion may result in the release of triethanolamine that is odorless and relatively benign. This embodiment of the invention is also preferred.

In a preferred embodiment, $R_1$, $R_2$ and $R_3$ are independently linear or branched unsubstituted alkyl groups of 1 to 3 carbon atoms, or linear or branched hydroxyalkyl groups of 1 to 3 carbon atoms that comprise 1 to 3 hydroxy groups as the only substituents (generally only one hydroxy group per carbon atom). More preferably, these radicals are independently methyl, hydroxymethyl, ethyl, 2-hydroxyethyl, 1-hydroxyethyl or 1,2-dihydroxyethyl and most preferably, they are either methyl or 2-hydroxyethyl.

$R_4$ is a substituted alkylenephenyl group that has at least one substituent on either the alkylene or phenyl moiety of the group. More preferably, the one or more substituents are on the phenyl moiety. The alkylene moiety can be linear or branched in nature and has from 1 to 3 carbon atoms (such as methylene, ethylene, n-propylene or isopropylene). Preferably, the alkylene moiety of $R_4$ has 1 or 2 carbon atoms and more preferably, it is methylene. The alkylene moiety can have as many substituents as there are available hydrogen atoms to be removed from a carbon atom. Useful alkylene substituents are the same as those described below in defining the phenyl substituents, but the most preferred substituents for the alkylene moiety are fluoro and alkoxy.

The phenyl moiety of $R_4$ can have from 1 to 5 substituents in any useful substitution pattern. Useful substituents include but are not limited to, halo groups (such as fluoro, chloro, bromo, and iodo), substituted or unsubstituted alkyl groups having from 1 to 12 carbon atoms (such as methyl, ethyl, isopropyl, t-butyl, n-pentyl and n-propyl) that can be further substituted with any of the substituents listed herein (such as haloalkyl groups including trihalomethyl groups), substituted or unsubstituted alkoxy groups having 1 to 12 carbon atoms (such as methoxy, ethoxy, isopropoxy, n-pentoxy and n-propoxy), cyano, nitro, substituted or unsubstituted aryl groups having 6 to 14 carbon atoms in the aromatic carbocyclic ring (as defined above for $R_1$, $R_2$ and $R_3$), substituted or unsubstituted alkyleneoxycarbonyl groups having 2 to 12 carbon atoms (such as methyleneoxycarbonyl, ethyleneoxycarbonyl and i-propyleneoxycarbonyl), substituted or unsubstituted alkylcarbonyloxy groups having 2 to 12 carbon atoms (such as methylenecarbonyloxy, ethylenecarbonyloxy and isopropylenecarbonyloxy), substituted or unsubstituted alkylcarbonyl groups having 2 to 12 carbon atoms (such as methylenecarbonyl, ethylenecarbonyl and isopropylenecarbonyl), amido groups, aminocarbonyl groups, trihalomethyl groups, perfluoroalkyl groups, formyl, mercapto and substituted or unsubstituted heterocyclic groups having 5 to 14 atoms in the ring that includes one or more nitrogen, sulfur, oxygen or selenium atoms with the remainder being carbon atoms (such as pyridyl, oxazolyl, thiophenyl, imidazolyl, and piperidinyl).

Preferably, $R_4$ contains 1 to 5 substituents (more preferably 1 or 2 substituents) on the phenyl moiety, which substituents are either halo groups, substituted or unsubstituted methyl or ethyl groups, or substituted or unsubstituted methoxy or 2-ethoxy groups. More preferably, $R_4$ comprises 1 to 3 methyl, fluoro, chloro, bromo or methoxy groups, or any combination of these groups on either the alkylene or phenyl moiety.

The use of the particular ammonium ions in which all of $R_1$–$R_3$ are 2-hydroxyethyl groups may result in less odor during imaging the heat-sensitive polymer.

The above described ionomeric polymers may be readily prepared using many methods that will be obvious to one skilled in the art. Many quaternary ammonium salts and carboxylic acid or anhydride-containing polymers are commercially available. Others can be readily synthesized using preparative techniques that would be obvious to one skilled in the art. Substituted benzyltrialkylammonium salts can be readily synthesized using preparative techniques that would be obvious to one skilled in the art. One convenient method involves the reaction of a substituted benzylamine with a desired alkyl halide, alkyl sulfonate ester or other alkyl-containing compound having a suitable "leaving" group. Another useful method involves the reaction of a substituted benzylic halide with a trialkylamine.

The carboxylic acid or anhydride-containing polymers can be converted to the desired quaternary ammonium carboxylate salts by a variety of methods including, but not necessarily limited to:

a) the reaction of a carboxylic acid- or acid anhydride-containing polymer with the hydroxide salt of the desired quaternary ammonium ion;

b) the use of ion exchange resin containing the desired quaternary ammonium ion;

c) the addition of the desired ammonium ion to a solution of the carboxylic acid-containing polymer or a salt thereof followed by dialysis;

d) the addition of a volatile acid salt of the desired quaternary ammonium ion (such as an acetate or formate salt) to the carboxylic acid-containing polymer followed by evaporation of the volatile component upon drying;

e) electrochemical ion exchange techniques;

f) the polymerization of monomers containing the desired quaternary ammonium carboxylate units; and g) the combination of a specific salt of the carboxylic acid-containing polymer and a specific quaternary ammonium salt, both chosen such that the undesired counterions will form an insoluble ionic compound in a chosen solvent and precipitate.

Preferably, the first method is employed.

Although it is especially preferred that all of the carboxylic acid (or latent carboxylic acid) functionalities of the polymer are converted to the desired quaternary ammonium salt, imaging compositions in which the polymer is incompletely converted may still retain satisfactory imageability. Preferably, at least 50 monomer percent of the carboxylic acid (or equivalent anhydride) containing monomers are reacted to form the desired quaternary ammonium groups.

The structures of exemplary ionomeric polymers which may be used in this invention are set forth below:

Polymer 1

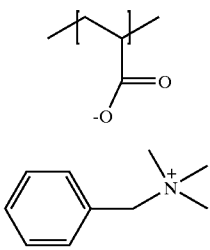

Polymer 2

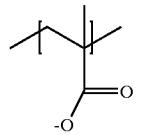

Polymer 3

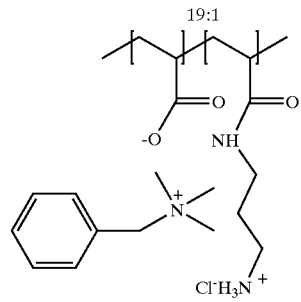

Polymer 4

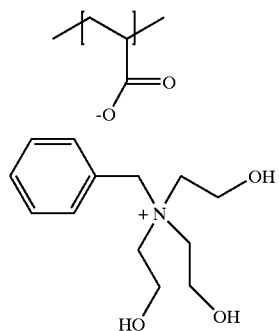

Polymer 5

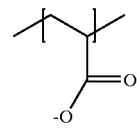

Polymer 6

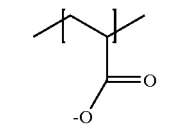

Polymer 7

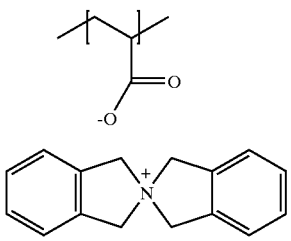

Polymer 8
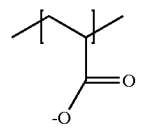
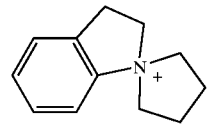
Polymer 9
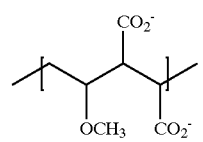
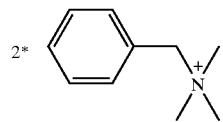 2*
Polymer 10
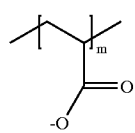
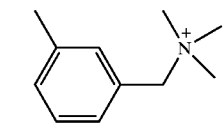
Polymer 11
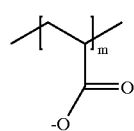
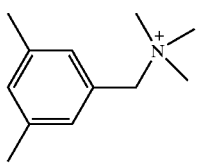
Polymer 12
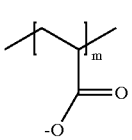
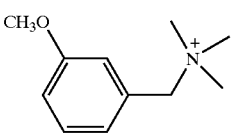
Polymer 13
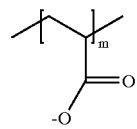
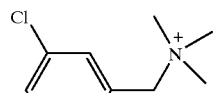
Polymer 14
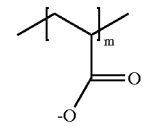
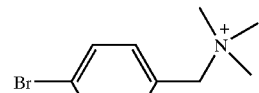
Polymer 15
Polymer 16
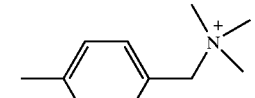
Polymer 17
Polymer 18
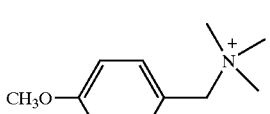

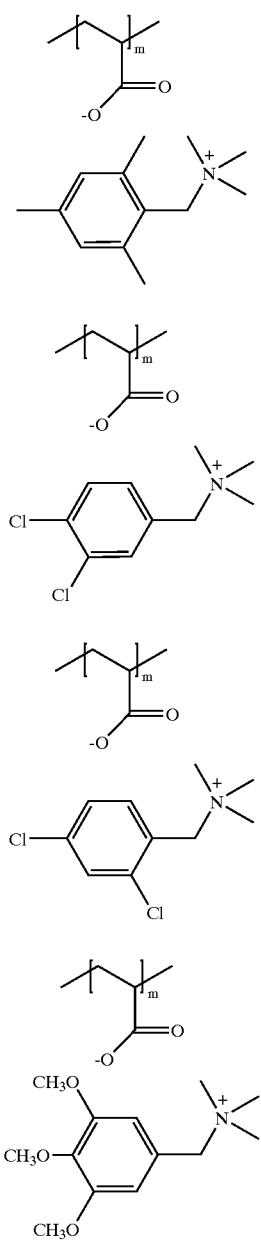

Polymer 19

Polymer 20

Polymer 21

Polymer 22

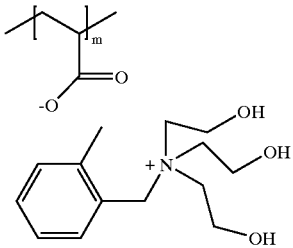

Polymer 23

The above-depicted polymers prepared as described below may be characterized as having the ratio of moles of quaternary ammonium carboxylate groups to grams of polymer as shown in TABLE I below:

TABLE I

| Polymer | Ratio |
|---|---|
| 1 | 1:221 |
| 2 | 1:235 |
| 3 | 1:230 |
| 4 | 1:311 |
| 5 | 1:207 |
| 6 | 1:245 |
| 7 | 1:293 |
| 8 | 1:245 |
| 9 | 1:228 |
| 10 | 1:235 |
| 11 | 1:249 |
| 12 | 1:251 |
| 13 | 1:256 |
| 14 | 1:300 |
| 15 | 1:239 |
| 16 | 1:251 |
| 17 | 1:235 |
| 18 | 1:291 |
| 19 | 1:263 |
| 20 | 1:290 |
| 21 | 1:290 |
| 22 | 1:311 |
| 23 | 1:325 |

The preparation of these polymers is described in U.S. Pat. Nos. 6,447,978 and 6,451,500 and PCT/US00/32841, which are incorporated herein by reference.

Variations from the representative procedure are noted where applicable in TABLE II below.

TABLE II

| Polymer # | Substituted Benzyl halide | Step A Conditions | Step A yield | [⁻OH] (mEq/g) of ammonium hydroxide solution (Step 13) |
|---|---|---|---|---|
| 10 | 3-methylbenzyl bromide | Ether, 25° C., 20 hours | 90% | 1.237 |
| 11 | 3,5-dimethylbenzyl bromide | Ether, 25° C., 20 hours | 97% | 1.145 |
| 12 | 1-bromomethyl-3-methoxybenzene | Ether, 25 C., 20 hours | 98% | 1.204 |
| 13 | 3-chlorobenzyl bromide | Ether, 25° C., 20 hours | 98% | 1.256 |
| 14 | 4-bromobenzyl bromide | Ether, 25 C., 20 hours | 99% | 1.330 |

TABLE II-continued

| Polymer # | Substituted Benzyl halide | Step A Conditions | Step A yield | [⁻OH] (mEq/g) of ammonium hydroxide solution (Step 13) |
|---|---|---|---|---|
| 15 | 4-fluorobenzyl bromide | Ether, 25 C., 20 hours | 97% | 0.952 |
| 16 | 4-methoxybenzyl chloride | Ether, 25 C., 20 hours | 84% | 2.220 |
| 17 | 4-methylbenzyl bromide | Ether, 25 C., 20 hours | 98% | 1.372 |
| 18 | Pentamethylbenzyl chloride | Ether, 3 eq. NMe$_3$, reflux, 20 hours | 98% | 1.100 |
| 19 | α-chloroisodurene | Ether, 3 eq. NMe$_3$, 20 hours at 25 C. then reflux for 4 hours | 83% | 1.520 |
| 20 | 3,4-dichlorobenzyl chloride | Ether, 3 eq. NMe$_3$, reflux for 24 hours | 54% | 1.09 |
| 21 | 2,4-dichlorobenzyl chloride | Ether, 3 eq. NMe$_3$, reflux, 20 hours | 61% | 1.14 |
| 22 | 3,4,5-trimethoxybenzyl bromide* | Ether, 25 C., 20 hours | 88% | 0.516 |

*3,4,5-Trimethoxybenzyl bromide synthesized from 3,4,5-trimethoxybenzyl alcohol using triphenylphosphine/CBr$_4$.

The ionomeric polymer may also comprise spiroquaternary ammonium cations that are any one of the following cations:

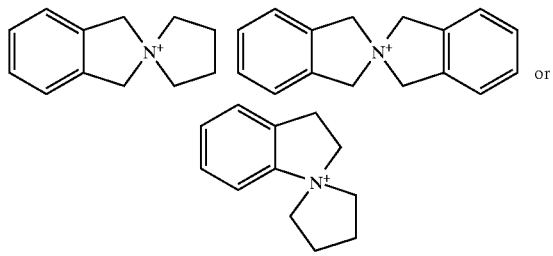

In another embodiment of this invention, the ionomeric polymers useful in this invention generally may also be any of a wide variety of crosslinked vinyl homopolymers and copolymers having the requisite organoonium groups. They are prepared from ethylenically unsaturated polymerizable monomers using any conventional polymerization techniques. Procedures and reactants needed to prepare all of these types of polymers are well known. With the additional teaching provided herein, the known polymer reactants and conditions can be modified by a skilled artisan to incorporate or attach a suitable pendant cationic group.

Preferably, the polymers are copolymers prepared from two or more ethylenically unsaturated polymerizable monomers, at least one of which contains the desired organoonium group, and one or more other monomers that are capable of providing crosslinking in the polymer and possibly adhesion to the support.

The ionomeric polymers useful in this embodiment of the invention can be composed of recurring units having more than one type of organoonium group. For example, such a polymer can have recurring units with both organoammonium groups and organosulfonium groups. It is also not necessary that all of the organoonium groups have the same alkyl substituents. For example, a polymer can have recurring units having more than one type of organoammonium group.

The presence of an organoonium group (such as an organoammonium or quaternary ammonium group, organophosphonium or organosulfonium group) apparently provides or facilitates the "switching" of the imageable composition from hydrophilic to oleophilic in the exposed areas upon exposure to energy that provides or generates heat, when the cationic moiety reacts with its counterion. The net result is the loss of charge. Such reactions are more easily accomplished when the anion of the organoonium group is more nucleophilic and/or more basic. For example, an acetate anion is typically more reactive than a chloride anion. By varying the chemical nature of the anion, the reactivity of the heat-sensitive polymer can be modified to provide optimal image resolution for a given set of conditions (for example, laser hardware and power, and printing press needs) balanced with sufficient ambient shelf life. Useful anions include the halides, carboxylates, sulfates, borates and sulfonates. Representative anions include, but are not limited to, chloride, bromide, fluoride, acetate, tetrafluoroborate, formate, sulfate, p-toluenesulfonate and others readily apparent to one skilled in the art. The halides and carboxylates are preferred.

The organoonium group is present in sufficient recurring units of the polymer so that the heat-activated reaction described above can occur to provide desired oleophilicity of the imaged composition printing surface. The group can be attached along a principal backbone of the polymer, or to one or more branches of a polymeric network, or both. Pendant groups can be chemically attached to the polymer backbone after polymer formation using known chemistry. For example, pendant organoammonium, organophosphonium or organosulfonium groups can be provided on a polymeric backbone by the nucleophilic displacement of a pendant leaving group (such as a halide or sulfonate ester) on the polymeric chain by a trivalent amine, divalent sulfur or trivalent phosphorous nucleophile. Pendant onium groups can also be provided by alkylation of corresponding pendant neutral heteroatom groups (nitrogen, sulfur or phosphorous) using any commonly used alkylating agent such as alkyl sulfonate esters or alkyl halides. Alternatively a monomer precursor containing the desired organoammonium, organophosphonium or organosulfonium group may be polymerized to yield the desired polymer.

The organoammonium, organophosphonium or organosulfonium group in the polymer provides the desired positive charge. Generally, preferred pendant organoonium groups can be illustrated by the following structures I, II and III:

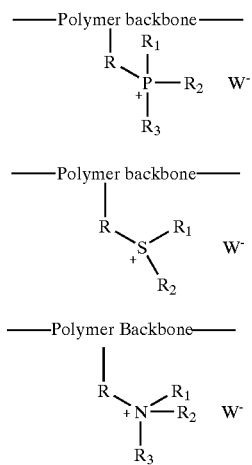

wherein R is a substituted or unsubstituted alkylene group having 1 to 12 carbon atoms that can also include one or more oxy, thio, carbonyl, amido or alkoxycarbonyl groups with the chain (such as methylene, ethylene, isopropylene, methylenephenylene, methyleneoxymethylene, n-butylene and hexylene), a substituted or unsubstituted arylene group having 6 to 10 carbon atoms in the ring (such as phenylene, naphthylene, xylylene and 3-methoxyphenylene), or a substituted or unsubstituted cycloalkylene group having 5 to 10 carbon atoms in the ring (such as 1,4-cyclohexylene, and 3-methyl-1-4-cyclohexylene). In addition, R can be combinations of two or more of the defined substituted or unsubstituted alkylene, arylene and cycloalkylene groups. Preferably, R is a substituted or unsubstituted ethyleneoxycarbonyl or phenylenemethylene group. Other useful substituents not listed herein could include combinations of any of those groups listed above as would be readily apparent to one skilled in the art.

$R_1$, $R_2$ and $R_3$ are independently substituted or unsubstituted alkyl group having 1 to 12 carbon atoms (such as methyl, ethyl, n-propyl, isopropyl, t-butyl, hexyl, hydroxymethyl, methoxymethyl, benzyl, methylenecarboalkoxy and a cyanoalkyl), a substituted or unsubstituted aryl group having 6 to 10 carbon atoms in the carbocyclic ring (such as phenyl, naphthyl, xylyl, p-methoxyphenyl, p-methylphenyl, m-methoxyphenyl, p-chlorophenyl, p-methylthiophenyl, p-N,N-dimethylaminophenyl, methoxycarbonylphenyl and cyanophenyl), or a substituted or unsubstituted cycloalkyl group having 5 to 10 carbon atoms in the carbocyclic ring (such as 1,3- or 1,4-cyclohexyl). Alternatively, any two of $R_1$, $R_2$ and $R_3$ can be combined to form a substituted or unsubstituted heterocyclic ring with the charged phosphorus, sulfur or nitrogen atom, the ring having 4 to 8 carbon, nitrogen, phosphorus, sulfur or oxygen atoms in the ring. Such heterocyclic rings include, but are not limited to, substituted or unsubstituted morpholinium, piperidinium and pyrrolidinium groups for Structure III. Other useful substituents for these various groups would be readily apparent to one skilled in the art, and any combinations of the expressly described substituents are also contemplated.

Preferably, $R_1$, $R_2$ and $R_3$ are independently substituted or unsubstituted methyl or ethyl groups.

$W^-$ is any suitable anion as described above. Acetate and chloride are preferred anions.

Polymers containing quaternary ammonium groups as described herein are most preferred in the practice of this embodiment of the invention.

In preferred embodiments, the polymers useful in the practice of this invention can be represented by the following Structure IV:

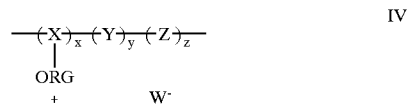

wherein X represents recurring units to which the organoonium groups ("ORG") are attached, Y represents recurring units derived from ethylenically unsaturated polymerizable monomers that may provide active sites for crosslinking using any of various crosslinking mechanisms (described below), and Z represents recurring units derived from any additional ethylenically unsaturated polymerizable monomers. The various recurring units are present in suitable amounts, as represented by x being from about 50 to about 99 mol %, y being from about 1 to about 20 mol %, and z being from 0 to about 49 mol %. Preferably, x is from about 80 to about 98 mol %, y is from about 2 to about 10 mol % and z is from 0 to about 18 mol %.

Crosslinking of the polymer can be achieved in a number of ways. There are numerous monomers and methods for crosslinking that are familiar to one skilled in the art. Some representative crosslinking strategies include, but are not limited to:

a) the reaction of an amine or carboxylic acid or other Lewis basic units with diepoxide crosslinkers;

b) the reaction of epoxide units within the polymer with difunctional amines, carboxylic acids, or other difunctional Lewis basic unit;

c) the irradiative or radical-initiated crosslinking of double bond-containing units such as acrylates, methacrylates, cinnamates, or vinyl groups;

d) the reaction of multivalent metal salts with ligating groups within the polymer (the reaction of zinc salts with carboxylic acid-containing polymers is an example);

e) the use of crosslinkable monomers that react via the Knoevenagel condensation reaction, such as (2-acetoacetoxy)ethylacrylate and methacrylate;

f) the reaction of amine, thiol, or carboxylic acid groups with a divinyl compound [such as bis (vinylsulfonyl) methane] via a Michael addition reaction;

g) the reaction of carboxylic acid units with crosslinkers having multiple aziridine units;

h) the reaction of crosslinkers having multiple isocyanate units with amines, thiols, or alcohols within the polymer;

i) mechanisms involving the formation of interchain sol-gel linkages [such as the use of the 3-(trimethoxysilyl) propylmethacrylate monomer];

j) oxidative crosslinking using an added radical initiator (such as a peroxide or hydroperoxide);

k) autoxidative crosslinking, such as employed by alkyd resins;

l) sulfur vulcanization; and m) processes involving ionizing radiation.

Monomers having crosslinking groups or active crosslinkable sites (such as attachment sites for epoxides) can be copolymerized with the other monomers noted above. Such monomers include, but are not limited to, 3-(trimethoxysilyl)propyl acrylate or methacrylate, cinnamoyl acrylate or methacrylate, N-methoxymethyl methacrylamide, N-aminopropylacrylamide hydrochloride, acrylic or methacrylic acid and hydroxyethyl methacrylate.

Preferred crosslinking is provided by the reaction of an amine-containing pendant group (such as N-aminopropylacrylamide hydrochloride) with a difunctional or trifunctional additive, such as a bis(vinylsulfonyl) compound.

Additional monomers that provide the additional recurring units represented by "Z" in Structure IV include any useful hydrophilic or oleophilic ethylenically unsaturated polymerizable monomer that may provide desired physical or printing properties to the imaging layer. Such monomers include, but are not limited to, acrylates, methacrylates, acrylonitrile, isoprene, styrene and styrene derivatives, acrylamides, methacrylamides, acrylic or methacrylic acid and vinyl halides.

Preferred polymers useful in the practice of this invention include any of Polymer 1, Polymer 2, Polymer 3, Polymer 4, Polymer 5, Polymer 6, Polymer 7, or Polymer 8, as identified in U.S. Pat. No. 6,190,830, which is incorporated herein by reference. A mixture of any two or more of these polymers can also by used. Several synthetic methods for the preparation of such polymers are disclosed in U.S. Pat. No. 6,190,830.

The imageable composition of this invention can include one or more of such homopolymers or copolymers, with or without minor amounts (less than 20 weight %) based on total dry weight of the layer of additional binder or polymeric materials that will not adversely affect its imaging properties. If a blend of polymers is used, they can comprise the same or different types of organoammonium, organophosphonium or organosulfonium groups. Such polymers are readily prepared using known reactants and polymerization techniques and chemistry described in a number of polymer textbooks. Monomers can be readily prepared using known procedures or purchased from a number of commercial sources.

In another preferred embodiment of this invention, the ionomeric polymers are charged polymers (ionomers) which can be of two broad classes of materials:

(i) crosslinked or uncrosslinked vinyl polymers comprising recurring units comprising positively-charged, pendant N-alkylated aromatic heterocyclic groups; and (ii) crosslinked or uncrosslinked polymers comprising recurring organoonium groups.

Each class of polymer is described in turn. The imageable composition can include mixtures of polymers from each class, or a mixture of one or more polymers of two or more classes. The Class II polymers are particularly preferred. Such polymers are also described in U.S. Pat. No. 6,399,268 and PCT/US00/07918.

Class I Polymers

The Class I polymers generally have a molecular weight of at least 1000 and can be any of a wide variety of hydrophilic vinyl homopolymers and copolymers having the requisite positively-charged groups. They are prepared from ethylenically unsaturated polymerizable monomers using any conventional polymerization technique. Preferably, the polymers are copolymers prepared from two or more ethylenically unsaturated polymerizable monomers, at least one of which contains the desired pendant positively-charged group, and another monomer that is capable of providing other properties, such as crosslinking sites and possibly adhesion to the support. Procedures and reactants needed to prepare these polymers are well known. With the additional teaching provided herein, the known polymer reactants and conditions can be modified by a skilled artisan to attach a suitable cationic group.

The presence of a cationic group apparently provides or facilitates the "switching" of the imaging layer from hydrophilic to hydrophobic in the areas that have been exposed to heat in some manner, when the cationic group reacts with its counterion. The net result is the loss of charge. Such reactions are more easily accomplished when the anion is more nucleophilic and/or more basic. For example, an acetate anion is typically more reactive than a chloride anion. By varying the chemical nature of the anion, the reactivity of the heat-sensitive polymer can be modified to provide optimal image resolution for a given set of conditions (for example, laser hardware and power, and printing press needs) balanced with sufficient ambient shelf life. Useful anions include the halides, carboxylates, sulfates, borates and sulfonates. Representative anions include, but are not limited to, chloride, bromide, fluoride, acetate, tetrafluoroborate, formate, sulfate, p-toluenesulfonate and others readily apparent to one skilled in the art. The halides and carboxylates are preferred.

The aromatic cationic group is present in sufficient recurring units of the polymer so that the heat-activated reaction described above can provide desired hydrophobicity of the imaged printing layer. The groups can be attached along a principal backbone of the polymer, or to one or more branches of a polymeric network, or both. The aromatic groups generally comprise 5 to 10 carbon, nitrogen, sulfur or oxygen atoms in the ring (at least one being a positively-charged nitrogen atom), to which is attached a branched or unbranched, substituted or unsubstituted alkyl group. Thus, the recurring units containing the aromatic heterocyclic group can be represented by the structure:

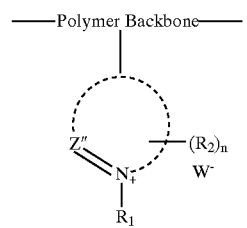

In this structure, $R_1$ is a branched or unbranched, substituted or unsubstituted alkyl group having from 1 to 12 carbon atoms (such as methyl, ethyl, n-propyl, isopropyl, t-butyl, hexyl, methoxymethyl, benzyl, neopentyl and dodecyl). Preferably, $R_1$ is a substituted or unsubstituted, branched or unbranched alkyl group having from 1 to 6 carbon atoms, and most preferably, it is a substituted or unsubstituted methyl group.

$R_2$ can be a substituted or unsubstituted alkyl group (as defined above, and additionally a cyanoalkyl group, a hydroxyalkyl group or alkoxyalkyl group), substituted or unsubstituted alkoxy having 1 to 6 carbon atoms (such as methoxy, ethoxy, isopropoxy, oxymethylmethoxy, n-propoxy and butoxy), a substituted or unsubstituted aryl group having 6 to 14 carbon atoms in the ring (such as phenyl, naphthyl, anthryl, p-methoxyphenyl, xylyl, and alkoxycarbonylphenyl), halo (such as chloro and bromo), a substituted or unsubstituted cycloalkyl group having 5 to 8 carbon atoms in the ring (such as cyclopentyl, cyclohexyl and 4-methylcyclohexyl), or a substituted or unsubstituted heterocyclic group having 5 to 8 atoms in the ring including at least one nitrogen, sulfur or oxygen atom in the ring (such as pyridyl, pyridinyl, tetrahydrofuranyl and tetrahydropyranyl). Preferably, $R_2$ is a substituted or unsubstituted methyl or ethyl group.

Z" represents the carbon and any additional nitrogen, oxygen, or sulfur atoms necessary to complete the 5- to 10-membered aromatic N-heterocyclic ring that is attached to the polymeric backbone. Thus, the ring can include two or more nitrogen atoms in the ring (for example, N-alkylated diazinium or imidazolium groups), or N-alkylated nitrogen-containing fused ring systems including, but not limited to, pyridinium, quinolinium, isoquinolinium, acridinium, phenanthradinium and others readily apparent to one skilled in the art.

W⁻ is a suitable anion as described above. Most preferably it is acetate or chloride.

Also in the above structure, n is 0 to 6, and is preferably 0 or 1. Most preferably, n is 0.

The aromatic heterocyclic ring can be attached to the polymeric backbone at any position on the ring. Preferably, there are 5 or 6 atoms in the ring, one or two of which are nitrogen. Thus, the N-alkylated nitrogen containing aromatic group is preferably imidazolium or pyridinium and most preferably it is imidazolium.

The recurring units containing the cationic aromatic heterocycle can be provided by reacting a precursor polymer containing unalkylated nitrogen containing heterocyclic units with an appropriate alkylating agent (such as alkyl sulfonate esters, alkyl halides and other materials readily apparent to one skilled in the art) using known procedures and conditions.

Preferred Class I polymers can be represented by the following structure:

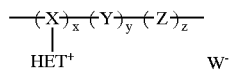

wherein X represents recurring units to which the N-alkylated nitrogen containing aromatic heterocyclic groups (represented by HET⁺) are attached, Y represents recurring units derived from ethylenically unsaturated polymerizable monomers that may provide active sites for crosslinking using any of various crosslinking mechanisms (described below), and Z represents recurring units derived from any additional ethylenically unsaturated polymerizable monomers. The various repeating units are present in suitable amounts, as represented by x being from about 20 to 100 mol %, y being from about 0 to about 20 mol %, and z being from 0 to 80 mol %. Preferably, x is from about 30 to about 98 mol %, y is from about 2 to about 10 mol % and z is from 0 to about 68 mol %.

Crosslinking of the polymers can be provided in a number of ways. There are numerous monomers and methods for crosslinking that are familiar to one skilled in the art. Some representative crosslinking strategies include, but are not necessarily limited to:

a) reacting an amine or carboxylic acid or other Lewis basic units with diepoxide crosslinkers;

b) reacting an epoxide units within the polymer with difunctional amines, carboxylic acids, or other difunctional Lewis basic unit;

c) irradiative or radical-initiated crosslinking of double bond-containing units such as acrylates, methacrylates, cinnamates, or vinyl groups;

d) reacting a multivalent metal salts with ligating groups within the polymer (the reaction of zinc salts with carboxylic acid-containing polymers is an example);

e) using crosslinkable monomers that react via the Knoevenagel condensation reaction, such as (2-acetoacetoxy)ethyl acrylate and methacrylate;

f) reacting an amine, thiol, or carboxylic acid groups with a divinyl compound (such as bis (vinylsulfonyl) methane) via a Michael addition reaction;

g) reacting a carboxylic acid units with crosslinkers having multiple aziridine units;

h) reacting a crosslinkers having multiple isocyanate units with amines, thiols, or alcohols within the polymer;

i) mechanisms involving the formation of interchain sol-gel linkages (such as the use of the 3-(trimethoxysilyl) propylmethacrylate monomer);

j) oxidative crosslinking using an added radical initiator (such as a peroxide or hydroperoxide);

k) autooxidative crosslinking, such as employed by alkyd resins;

l) sulfur vulcanization; and m) processes involving ionizing radiation.

Monomers having crosslinkable groups or active crosslinkable sites (or groups that can serve as attachment points for crosslinking additives, such as epoxides) can be copolymerized with the other monomers noted above. Such monomers include, but are not limited to, 3-(trimethoxysilyl)propyl acrylate or methacrylate, cinnamoyl acrylate or methacrylate, N-methoxymethyl methacrylamide, N-aminopropylacrylamide hydrochloride, acrylic or methacrylic acid and hydroxyethyl methacrylate.

Additional monomers that provide the repeating units represented by Z in the above structure include any useful hydrophilic or oleophilic ethylenically unsaturated polymerizable monomer that may provide desired physical or printing properties to the imageable composition. Such monomers include, but are not limited to, acrylates, methacrylates, isoprene, acrylonitrile, styrene and styrene derivatives, acrylamides, methacrylamides, acrylic or methacrylic acid and vinyl halides.

Representative Class I polymers are identified hereinbelow as Polymers A and C–F. Mixtures of these polymers can also be used. Polymer B below is a precursor to a useful Class I polymer.

Class II Polymers

The Class II polymers also generally have a molecular weight of at least 1000. They can be any of a wide variety of vinyl or non-vinyl homopolymers and copolymers.

Non-vinyl polymers of Class II include, but are not limited to, polyesters, polyamides, polyamide-esters, polyarylene oxides and derivatives thereof, polyurethanes, polyxylylenes and derivatives thereof, silicon-based sol gels (solsesquioxanes), polyamidoamines, polyimides, polysulfones, polysiloxanes, polyethers, poly(ether ketones), poly(phenylene sulfide) ionomers, polysulfides and polybenzimidazoles. Preferably, such non-vinyl polymers are silicon based sol gels, polyarylene oxides, poly (phenylene sulfide) ionomers or polyxylylenes, and most preferably, they are poly(phenylene sulfide) ionomers. Procedures and reactants needed to prepare all of these types of polymers are well known. With the additional teaching provided herein, the known polymer reactants and conditions can be modified by a skilled artisan to incorporate or attach a suitable cationic organoonium moiety.

Silicon-based sol gels useful in this invention can be prepared as a crosslinked polymeric matrix containing a silicon colloid derived from di-, tri- or tetraalkoxy silanes. These colloids are formed by methods described in U.S. Pat. Nos. 2,244,325, 2,574,902 and 2,597,872. Stable dispersions of such colloids can be conveniently purchased from companies such as the DuPont Company. A preferred sol-gel uses N-trimethoxysilylpropyl-N,N,N-trimethylammonium acetate both as the crosslinking agent and as the polymer layer forming material.

The presence of an organoonium moiety that is chemically incorporated into the polymer is believed to provide or facilitate the "switching" of the imageable composition from hydrophilic to oleophilic in the exposed areas upon exposure to energy that provides or generates heat, when the cationic moiety reacts with its counterion. The net result is the loss of charge. Such reactions are more easily accomplished when the anion of the organoonium moiety is more nucleophilic and/or more basic, as described above for the Class I polymers.

The organoonium moiety within the polymer can be chosen from a trisubstituted sulfur moiety (organosulfonium), a tetrasubstituted nitrogen moiety (organoammonium), or a tetrasubstituted phosphorous moiety (organophosphonium). The tetrasubstituted nitrogen (organoammonium) moieties are preferred. This moiety can be chemically attached to (that is, pendant) the polymer backbone, or incorporated within the backbone in some fashion, along with the suitable counterion. In either embodiment, the organoonium moiety is present in sufficient repeating units of the polymer (at least 20 mol %) so that the heat-activated reaction described above can occur to provide desired hydrophobicity of the imaging layer. When chemically attached as a pendant group, the organoonium moiety can be attached along a principal backbone of the polymer, or to one or more branches of a polymeric network, or both. When chemically incorporated within the polymer backbone, the moiety can be present in either cyclic or acyclic form, and can also form a branching point in a polymer network. Preferably, the organoonium moiety is provided as a pendant group along the polymeric backbone. Pendant organoonium moieties can be chemically attached to the polymer backbone after polymer formation, or functional groups on the polymer can be converted to organoonium moieties using known chemistry. For example, pendant quaternary ammonium groups can be provided on a polymeric backbone by the displacement of a "leaving group" functionality (such as a halogen) by a tertiary amine nucleophile. Alternatively, the organoonium group can be present on a monomer that is then polymerized or derived by the alkylation of a neutral heteroatom unit (trivalent nitrogen or phosphorous group or divalent sulfur group) already incorporated within the polymer.

The organoonium moiety is substituted to provide a positive charge. Each substituent must have at least one carbon atom that is directly attached to the sulfur, nitrogen or phosphorus atom of the organoonium moiety. Useful substituents include, but are not limited to, substituted or unsubstituted alkyl groups having 1 to 12 carbon atoms and preferably from 1 to 7 carbon atoms (such as methyl, ethyl, n-propyl, isopropyl, t-butyl, hexyl, methoxyethyl, isopropoxymethyl, substituted or unsubstituted aryl groups (phenyl, naphthyl, p-methylphenyl, m-methoxyphenyl, p-chlorophenyl, p-methylthiophenyl, p-N,N-dimethylaminophenyl, xylyl, methoxycarbonylphenyl and cyanophenyl), and substituted or unsubstituted cycloalkyl groups having 5 to 8 carbon atoms in the carbocyclic ring (such as cyclopentyl, cyclohexyl, 4-methylcyclohexyl and 3-methylcyclohexyl). Other useful substituents would be readily apparent to one skilled in the art, and any combination of the expressly described substituents is also contemplated.

The organoonium moieties include any suitable anion as described above for the Class I polymers. The halides and carboxylates are preferred.

Representative Class II non-vinyl polymers are identified herein below as Polymers G–H and J. Mixtures of these polymers can also be used. Polymer I is a precursor to Polymer J.

In addition, vinyl Class II polymers can be used in the practice of this invention. Like the non-vinyl polymers, such heat-sensitive polymers are composed of recurring units having one or more types of organoonium group. For example, such a polymer can have recurring units with both organoammonium groups and organosulfonium groups. It is also not necessary that all of the organoonium groups have the same alkyl substituents. For example, a polymer can have recurring units having more than one type of organoammonium group. Useful anions in these polymers are the same as those described above for the non-vinyl polymers. In addition, the halides and carboxylates are preferred.

The organoonium group is present in sufficient recurring units of the polymer so that the heat-activated reaction described above can occur to provide desired hydrophobicity of the imageable composition. The group can be attached along a principal backbone of the polymer, or to one or more branches of a polymeric network, or both. Pendant groups can be chemically attached to the polymer backbone after polymer formation using known chemistry. For example, pendant organoammonium, organophosphonium or organosulfonium groups can be provided on a polymeric backbone by the nucleophilic displacement of a pendant leaving group (such as a halide or sulfonate ester) on the polymeric chain by a trivalent amine, divalent sulfur or trivalent phosphorous nucleophile. Pendant onium groups can also be provided by alkylation of corresponding pendant neutral heteroatom groups (nitrogen, sulfur or phosphorous) using any commonly used alkylating agent such as alkyl sulfonate esters or alkyl halides. Alternatively a monomer precursor containing the desired organoammonium, organophosphonium or organosulfonium group may be polymerized to yield the desired polymer.

Polymers A and C–F are illustrative of Class I polymers (Polymer B is a precursor to Polymer C), Polymers G–H and J are illustrative of Class II non-vinyl polymers (Polymer I is a precursor to Polymer J), and Polymers K–R are illustrative of Class II vinyl polymers. The synthesis of these polymers is below, and is also described in U.S. patent application Ser. No. 09/293,389 and PCT/US00/07918.

Synthetic Methods

Preparation of Polymer A: Poly (1-vinyl-3-methylimidazolium chloride-co-N-(3-aminopropyl) methacrylamide hydrochloride)

A. Preparation of 1-Vinyl-3-methylimidazolium methanesulfonate monomer: Freshly distilled 1-vinylimidazole (20.00 g, 0.21 mol) is combined with methyl methanesulfonate (18.9 ml, 0.22 mol) and 3-t-butyl-4-hydroxy-5-methylphenyl sulfide (about 1 mg) in diethyl ether (100 ml) in a round bottomed flask equipped with a reflux condenser and a nitrogen inlet and stirred at room temperature for 48 hours. The resulting precipitate is filtered off, thoroughly washed with diethyl ether, and dried overnight under vacuum at room temperature to afford a product.

Copolymerization/ion exchange: 1-Vinyl-3-methylimidazolium methanesulfonate (5.00 g, $2.45 \times 10^{-2}$ mol), N-(3-aminopropyl) methacrylamide hydrochloride (0.23 g, 1.29×10$^{-3}$ mol) and 2,2'-azobisisobutyronitrile (AIBN) (0.052 g, 3.17×10$^{-4}$ mol) are dissolved in methanol (60 ml) in a 250 ml round bottomed flask equipped with a rubber septum. The solution is bubble degassed with nitrogen for ten minutes and heated at 60° C. in a water bath for 14 hours. The viscous solution is precipitated into 3.5 liters of tetrahydrofuran and dried under vacuum overnight at 50° C. to give a product. The polymer is then dissolved in 100 ml methanol and converted to the chloride by passage through a flash column containing 400 cm$^3$ DOWEX® 1X8-100 ion exchange resin.

Preparation of Polymer B: Poly(methyl methacrylate-co-4-vinylpyridine) (9:1 molar ratio)

Methyl methacrylate (30 ml), 4-vinylpyridine (4 ml), AIBN (0.32 g, 1.95×10$^{-3}$ mol), and N,N-dimethylformamide (40 ml, DMF) are combined in a 250 ml round bottomed flask and fitted with a rubber septum. The solution is purged with nitrogen for 30 minutes and heated for 15 hours at 60° C. Methylene chloride and DMF (150 ml of each) are added to dissolve the viscous product and the product solution is precipitated twice into isopropyl ether. The precipitated polymer is filtered and dried overnight under vacuum at 60° C.

Preparation of Polymer C: Poly(methyl methacrylate-co-N-methyl-4-vinylpyridinium formate) (9:1 molar ratio)

Polymer B (10 g) is dissolved in methylene chloride (50 ml) and partially reacted with methyl p-toluenesulfonate (1 ml) at reflux for 15 hours. The partially reacted product is precipitated into hexane, then dissolved in neat methyl methanesulfonate (25 ml) and heated at 70° C. for 20 hours. The product is precipitated once into diethyl ether and once into isopropyl ether from methanol and dried under vacuum overnight 60° C. A flash chromatography column is loaded with 300 cm$^3$ of DOWEX® 550 hydroxide ion exchange resin in water eluent. This resin is converted to the formate by running a liter of 10% formic acid through the column. The column and resin are thoroughly washed with methanol, and the product polymer is dissolved in methanol and passed through the column.

Preparation of Polymer D: Poly(methyl methacrylate-co -N-butyl-4-vinylpyridinium formate) (9:1 molar ratio)

Polymer B (5 g) is heated at 60° C. for 15 hours in 1-bromobutane (200 ml). The precipitate that forms is dissolved in methanol, precipitated into diethyl ether, and dried for 15 hours under vacuum at 60° C. The polymer is converted from the bromide to the formate using the method described in the preparation of Polymer C.

Preparation of Polymer E: Poly(methyl methacrylate -co-2-vinylpyridine) (9:1 molar ratio)

Methyl methacrylate (18 ml), 2-vinylpyridine (2 ml), AIBN (0.16 g,), and DMF (30 ml) are combined in a 250 ml round bottomed flask and fitted with a rubber septum. The solution is purged with nitrogen for 30 minutes and heated for 15 hours at 60° C. Methylene chloride (50 ml) is added to dissolve the viscous product and the product solution is precipitated twice into isopropyl ether. The precipitated polymer is filtered and dried overnight under vacuum at 60° C.

Preparation of Polymer F: Poly(methyl methacrylate-co-N -methyl-2-vinvlpyridinium formate) (9:1 molar ratio)

Polymer E (10 g) is dissolved in 1,2-dichloroethane (100 ml) and reacted with methyl p-toluenesulfonate (15 ml) at 70° C. for 15 hours. The product is precipitated twice into diethyl ether and dried under vacuum overnight at 60° C. A sample of this polymer is converted from the p-toluenesulfonate to the formate using the procedure described above for Polymer C.

Preparation of Polymer G: Poly(p-xylidenetetrahydro-thiophenium chloride)

Xylylene-bis-tetrahydrothiophenium chloride (5.42 g, 0.015 mol) is dissolved in 75 ml of deionized water and filtered through a fritted glass funnel to remove a small amount of insolubles. The solution is placed in a three-neck round-bottomed flask on an ice bath and sparged with nitrogen for fifteen minutes. A solution of sodium hydroxide (0.68 g, 0.017 mol) is added dropwise over fifteen minutes via addition funnel. When about 95% of the hydroxide solution is added, the reaction solution becomes very viscous and the addition is stopped. The reaction is brought to pH 4 with 10% HCl and purified by dialysis for 48 hours.

Preparation of Polymer H: Poly(phenylene sulfide-co -methyl(4-thiophenyl)sulfonium chloride)

Poly (phenylene sulfide) (15.0 g, 0.14 mol-repeating units), methanesulfonic acid (75 ml), and methyl triflate (50.0 g, 0.3 mol) are combined in a 500 ml round bottomed flask equipped with a heating mantle, reflux condenser, and nitrogen inlet. The reaction mixture is heated to 90° C. at which point a homogeneous, brown solution results and is allowed to stir at room temperature overnight. The reaction mixture is poured into 500 cm$^3$ of ice and brought to neutrality with sodium bicarbonate. The resultant liquid/solid mixture is diluted to a final volume of 2 liters with water and dialyzed for 48 hours at which point most of the solids will dissolve. The remaining solids are removed by filtration and the remaining liquids are slowly concentrated to a final volume of 700 ml under a stream of nitrogen. The polymer is ion exchanged from the triflate to the chloride by passing it through a column of DOWEX® 1x8-100 resin.

Preparation of Polymer I: Brominated poly(2,6-dimethyl-1,4-phenylene oxide)

Poly (2,6-dimethyl-1,4-phenylene oxide) (40 g, 0.33 mol repeating units) is dissolved in carbon tetrachloride (2400 ml) in a 5 liter round bottomed 3-neck flask with a reflux condenser and a mechanical stirrer. The solution is heated to reflux and a 150 Watt flood lamp is applied. N-bromosuccinimide (88.10 g, 0.50 g) is added portionwise over 3.5 hours, and the reaction is allowed to stir at reflux for an additional hour. The reaction is cooled to room temperature to yield an orange solution over a brown solid. The liquid is decanted and the solids are stirred with 100 ml methylene chloride to leave a white powder (succinimide) behind. The liquid phases are combined, concentrated to 500 ml via rotary evaporation, and precipitated into methanol to yield a yellow powder. The crude product is precipitated twice more into methanol and dried overnight under vacuum at 60° C.

Preparation of Polymer J: Dimethyl sulfonium bromide derivative of poly (2,6-dimethyl-1,4-phenylene oxide)

Brominated poly(2,6-dimethyl-1,4-phenylene oxide) described above (2.00 g, 0.012 mol benzyl bromide units) is dissolved in methylene chloride (20 ml) in a 3-neck round bottomed flask outfitted with a condenser, nitrogen inlet, and septum. Water (10 ml) is added along with dimethyl sulfide (injected via syringe) and the two-phase mixture is stirred at room temperature for one hour and then at reflux at which point the reaction turned into a thick dispersion. This is poured into 500 ml of tetrahydrofuran and agitated vigorously in a chemical blender. The product, which gels after approximately an hour in the solid state, is recovered by filtration and quickly redissolved in 100 ml methanol and stored as a methanolic solution.

Preparation of Polymer K: Poly(methyl methacrylate -co-2-trimethylammoniumethyl methacrylic chloride-co -N-(3-aminopropyl) methacrylamide hydrochloride) (7:2:1 molar ratio)

Methyl methacrylate (24.6 ml, 0.23 mol), 2-trimethylammoniumethyl methacrylic chloride (17.0 g, 0.08 mol), n-(3-aminopropyl) methacrylamide hydrochloride (10.0 g, 0.56 mol), azobisisobutyronitrile (0.15 g, $9.10 \times 10^{-4}$ mol, AIBN), water (20 ml) and dimethylformamide (150 ml) are combined in a round bottom flask fitted with a rubber septum. The solution is bubble degassed with nitrogen for 15 minutes and placed in a heated water bath at 60° C. overnight. The viscous product solution is diluted with methanol (125 ml) and precipitated three times from methanol into isopropyl ether. The product is dried under vacuum at 60° C. for 24 hours and stored in a dessicator.

Preparation of Polymer L: Poly(methyl methacrylate-co -2-trimethylammoniumethyl methacrylic acetate-co -N-(3-aminopropyl) methacrylamide) (7:2:1 molar ratio)

Polymer K (3.0 g) is dissolved in 100 ml of methanol and neutralized by passing through a column containing 300 cm³ of tertiary amine functionalized crosslinked polystyrene resin (Scientific Polymer Products #726, 300 cm²) with methanol eluent. That polymer is then converted to the acetate using a column of 300 cm³ DOWEX® 1x8-100 ion exchange resin (that is, converted from the chloride to the acetate by washing with 500 ml glacial acetic acid) and methanol eluent.

Preparation of Polymer M: Poly(methyl methacrylate-co -2-trimethylammoniumethyl methacrylic fluoride-co -N-(3-aminopropyl) methacrylamide hydrochloride) (7:2:1 molar ratio)

Polymer K (3.0 g) is dissolved in 100 ml of methanol and neutralized by passing through a column containing 300 cm³ tertiary amine functionalized crosslinked polystyrene resin (Scientific Polymer Products #726, 300 cm²) with methanol eluent. The polymer is then converted to the fluoride using a column of 300 cm³ DOWEX®1x8-100 ion exchange resin (that is, converted from the chloride to the fluoride by washing with 500 g of potassium fluoride) and methanol eluent.

Preparation of Polymer N: Poly(vinylbenzyl trimethylammonium chloride-co-N-(3-aminopropyl) methacrylamide hydrochloride) (19:1 molar ratio)

Vinylbenzyl trimethylammonium chloride (19 g, 0.0897 mol, 60:40 mixture of p,m isomers), N-(3-aminopropyl) methacrylamide hydrochloride (1 g, 0.00562 mol), 2,2'-azobis(2-methylpropionamidine) dihydrochloride (0.1 g), and deionized water (80 ml) are combined in a round bottom flask fitted with a rubber septum. The reaction mixture is bubble degassed with nitrogen for 15 minutes and placed in a water bath at 60° C. for four hours. The resulting viscous product solution is precipitated into acetone, dried under vacuum at 60 ° C. for 24 hours, and stored in a dessicator.

Preparation of Polymer O: Poly (vinylbenzyltrimethyl -phosphonium acetate-co-N-(3-aminopropyl) methacrylamide hydrochloride) (19:1 molar ratio)

A. Vinylbenzyl bromide (60:40 mixture of p,m isomers), vinylbenzyl chloride (50.60 g, 0.33 mol, 60:40 mixture of p,m isomers), sodium bromide (6.86 g, $6.67 \times 10^{-2}$ mol), N-methylpyrrolidone (300 ml, passed through a short column of basic alumina), ethyl bromide (260 g), and 3-t-butyl-4-hydroxy-5-methyl phenyl sulfide (1.00 g, $2.79 \times 10^{-3}$ mol) are combined in a 1 liter round bottomed flask fitted with a reflux condenser and a nitrogen inlet and the mixture is heated at reflux for 72 hours at which point the reaction has proceeded to >95% conversion. The reaction mixture is poured into 1 liter of water and extracted twice with 300 ml of diethyl ether. The combined ether layers are extracted twice with 1 liter of water, dried over $MgSO_4$, and the solvents are stripped by rotary evaporation to yield yellowish oil. The crude product is purified by vacuum distillation.

B. Vinylbenzyl trimethylphosphonium bromide: Trimethylphosphine (50.0 ml of a 1.0 molar solution in tetrahydrofuran, $5.00 \times 10^{-2}$ mol) is added via addition funnel over about 2 minutes into a thoroughly nitrogen degassed dispersion of vinylbenzyl bromide (9.85 g, $5.00 \times 10^{-2}$ mol) in diethyl ether (100 ml). A solid precipitate begins to form almost immediately. The reaction is allowed to stir for 4 hours at room temperature, then is placed in a freezer overnight. The solid product is isolated by filtration, washed three times with 100 ml of diethyl ether, and dried under vacuum for 2 hours. Pure product is recovered as a white powder.

C. Poly (vinylbenzyltrimethylphosphonium bromide-co-N-(3-aminopropyl)methacrylamide) (19:1 molar ratio): Vinylbenzyltrimethylphosphonium bromide (5.00 g, $1.83 \times 10^{-2}$ mol), N-(3-aminopropyl) methacrylamide hydrochloride (0.17 g, $9.57 \times 10^{-4}$ mol), azobisisobutyronitrile (0.01 g, $6.09 \times 10^{-5}$ mol), water (5.0 ml), and dimethylformamide (25 ml) are combined in a 100 ml round bottomed flask sealed with a rubber septum, bubble degassed for 10 minutes with nitrogen, and placed in a warm water bath (55° C.) overnight. The viscous solution is precipitated into tetrahydrofaran and dried under vacuum overnight at 60° C. The liquids are filtered off, concentrated on a rotary evaporator to a volume of about 200 ml, precipitated again into tetrahydrofuran, and dried under vacuum overnight at 60° C.

D. Poly (vinylbenzyltrimethylphosphonium acetate-co-N-(3-aminopropyl) methacrylamide hydrochloride) (19:1 molar ratio): DOWEX® 550 (a hydroxide anion exchange resin) (about 300 cm³) is poured into a flash column with 3:1 methanol/water eluent. About 1 liter of glacial acetic acid is passed through the column to convert it to the acetate, followed by about 3 liters of 3:1 methanol/water. 3.0 g of the product from step C in 200 ml of 3:1 methanol/water is passed through the acetate resin column and the solvents are stripped on a rotary evaporator. The resulting viscous oil was thoroughly dried under vacuum to afford a glassy, yellowish material (Polymer O).

Preparation of Polymer P: Poly (dimethyl-2-(methacryloyloxy) ethylsulfonium chloride-co-N-(3-aminopropyl) methacrylamide hydrochloride) (19:1 molar ratio)

A. Dimethyl-2-(methacryloyloxy) ethylsulfonium methylsulfate: 2-(Methylthio) ethylmethacrylate (30.00 g, 0.19 mol), dimethyl sulfate (22.70 g, 0.18 mol), and benzene (150 ml) are combined in a 250 ml round bottomed flask outfitted with a reflux condenser and a nitrogen inlet. The reaction solution is heated at reflux for 1.5 hours and allowed to stir at room temperature for 20 hours at which point the reaction has proceeded to about 95% yield. The solvent is removed by rotary evaporation to afford brownish oil that is stored as a 20 wt. % solution in dimethylformamide and used without further purification.

B. Poly (dimethyl-2-(methacryloyloxy) ethylsulfonium methylsulfate-co-N-(3-aminopropyl) methacrylamide hydrochloride) (19:1 molar ratio): Dimethyl-2-(methacryloyloxy) ethylsulfonium methylsulfate (93.00 g of 20 wt. % solution in dimethylformamide, $6.40 \times 10^{-2}$ mol), N-(3-aminopropyl) methacrylamide hydrochloride (0.60 g, $3.36 \times 10^{-3}$ mol), and azobisisobutyronitrile (0.08 g, $4.87 \times 10^{-4}$ mol) are dissolved in methanol (100 ml) in a 250 ml round bottomed flask fitted with a septum. The solution is bubble degassed with nitrogen for 10 minutes and heated for 20 hours in a warm water bath at 55° C. The reaction is precipitated into ethyl acetate, redissolved in methanol, precipitated a second time into ethyl acetate, and dried under vacuum overnight. A white powder is recovered.

C. Poly (dimethyl-2-(methacryloyloxy) ethylsulfonium chloride-co-N-(3-aminopropyl) methacrylamide hydrochloride) (19:1 molar ratio): The precursor polymer (2.13 g) from step B is dissolved in 100 ml of 4:1 methanol/water and passed through a flash column containing 300 cm$^3$ of DOWEX® 1x8-100 anion exchange resin using 4:1 methanol/water eluent. The recovered solvents are concentrated to about 30 ml and precipitated into 300 ml of methyl ethyl ketone. The damp, white powder collected is redissolved in 15 ml of water and stored in a refrigerator as a solution of Polymer P.

Preparation of Polymer Q: Poly (vinylbenzyldimethylsulfonium methylsulfate)

A. Methyl (vinylbenzyl) sulfide: sodium methanethiolate (24.67 g, 0.35 mol) is combined with methanol (250 ml) in a 1 liter round bottomed flask outfitted with an addition funnel and a nitrogen inlet. Vinylbenzyl chloride (41.0 ml, 60:40 mixture of p and o isomers, 0.29 mol) in tetrahydrofuran (100 ml) is added via addition funnel over 30 minutes. The reaction mixture grows slightly warm and a milky suspension is obtained. This is allowed to stir at room temperature for 20 hours. Another portion of sodium methanethiolate is added (5.25 g, $7.49 \times 10^{-2}$ mol) and after ten minutes, the reaction has proceeded to completion. Diethyl ether (400 ml) is added and the resulting mixture is extracted twice with 600 ml of water and once with 600 ml of brine. The resulting organic extracts are dried over magnesium sulfate, a small amount (about 1 mg) of 3-t-butyl-4-hydroxy-5-methyl phenyl sulfide is added, and the solvents are stripped by rotary evaporation to afford a yellowish oil. Purification by vacuum distillation through a long Vigreux column yields the pure product as a clear liquid.

B. Dimethyl (vinylbenzyl) sulfonium methylsulfate: methyl (vinylbenzyl) sulfide (13.59 g, $8.25 \times 10^{-2}$ mol), benzene (45 ml), and dimethyl sulfate (8.9 ml, $9.4 \times 10^{-2}$ mol) are combined in a 100 ml round bottomed flask equipped with a nitrogen inlet and allowed to stir at room temperature for 44 hours, at which point two layers are present. Water (20 ml) is added and the top (benzene) layer is removed by pipette. The aqueous layer is extracted three times with 30 ml of diethyl ether and a vigorous stream of nitrogen is bubbled through the solution to remove residual volatile compounds. The product is used without further purification as a 35% (w/w) solution.

C. Poly (dimethyl (vinylbenzyl) sulfonium methylsulfate): All of the dimethyl (vinylbenzyl) sulfonium methylsulfate solution from the previous step (approximately $5.7 \times 10^{-2}$ mol) is combined with water (44 ml) and sodium persulfate (0.16 g, $6.72 \times 10^{-4}$ mol) in a 200 ml round bottomed flask fitted with a rubber septum. The reaction solution is bubble degassed with nitrogen for ten minutes and heated for 24 hours in a water bath at 50° C. Additional sodium persulfate (0.16 g, $6.72 \times 10^{-4}$ mol) is added and the reaction is allowed to proceed for 18 more hours at 50° C. The solution is precipitated into acetone and immediately redissolved in water to give 100 ml of a solution of Polymer Q.

Preparation of Polymer R: Poly (vinylbenzyldimethylsulfonium chloride)

The aqueous product solution of Polymer Q (16 ml, ~4.0 g solids) is precipitated into a solution of benzyltrimethylammonium chloride (56.0 g) in isopropanol (600 ml). The solvents are decanted and the solids are washed by stirring for 10 minutes in 600 ml of isopropanol and quickly dissolved in water to give 35 ml of a solution of Polymer R (11.1% solids). There is >90% conversion to the chloride.

The amount of the ionomeric polymer in the coating composition is not particularly limited and depends on the molecular weight of the polymer and the coating method to be used. In most cases, the amount is within the range of about 0.2 to about 20 wt % based on the total coating composition, more preferred about 0.2 to about 15 wt %; for slot coater application it is most preferred from about 2 to about 7 wt %, while for application with a roll coater the amount is most preferred from about 5% to about 15 wt %.

The pseudoplastic thickening agent of the coating composition may be any highly viscous polymer which shows thixotropy. Examples are for instance xanthan gum, high viscous cellulose and cellulose derivatives like hydroxyethyl cellulose, carboxymethyl cellulose and methyl cellulose, hydrophobically-modified ethoxylated polyurethane ("HEUR"), styrene-maleic anhydride terpolymers ("SMAT"), hydrophobically-modified alkali-swellable emulsions ("HASE"), high viscous sodium alginate, guar gum, locust bean gum, gum karaya, gum tragacanth, high viscous starch, carrageenan, casein, hectorit, high viscous polyvinylpyrrolidone, high viscous polyvinyl alcohol and mixtures thereof. Preferred are such thickeners which show thixotropic as well as pseudoplastic behavior, and thixotropic thickeners which undergo shear thinning. Preferred thickeners are xanthan gum and high viscous hydroxy ethyl cellulose; xanthan gum is the most preferred one. Other effective materials exemplified in the examples are RHEOLATE 1, an aqueous acrylic emulsion available from Rheox, Inc., VISCALEX VG2, an acrylic copolymer available from Ciba Specialty Chemicals, BERNACOL E411 FQ, a non-ionic cellulose ether available from Akzo Nobel, and the thickeners described in U.S. Pat. No. 4,226,754 (herein incorporated by reference). The amount of the thickener in the coating composition is not particularly limited; however, the amount of the thickener is preferably such that the viscosity of the coating composition at medium shear stress is within the range of about 2.5 to about 60 mPa·s, preferably about 5 to about 50 mPa·s when measured according to Brookfield, DV-II-LV at 20° C. with a UL adapter. In most cases the amount of the thickener is from about 0.02 to about 0.2 wt. % based on the total composition, preferably about 0.1 wt. %.

The coating solutions contain water (preferably demineralized water), an organic solvent miscible with water (like lower alcohols and glycols) or mixtures thereof as the solvent. Preferred solvents are water and a mixture of water and a lower alcohol (like isopropanol). The amount of the solvent is not limited; however, suitably the amount of the solvent is about 80 to about 99 wt. % based on the total composition, preferably about 98 wt %.

The coating composition may further contain at least one of preservatives, surfactants, dyes, biocides, sequestering agents, and antifoaming agents which are usually used in gum solutions. Suitable surfactants are anionic surfactants such as sodium dodecyl sulphate, sodium dodecyl sulphonate, alkylamino carboxylates and dicarboxylates, cationic surfactants such as tetraalkyl ammonium salts, and non-ionic surfactants such as polyethylene glycols. Examples of suitable preservatives are for instance p-hydroxybenzoic acid ester and 1,2-benzisothiazolin-3-on. Useful sequestering agents are for instance polyphosphates, Trilon® (available from BASF, Germany) and Sequion from Polygon. Sodium nitrate, ammonium nitrate and ammonium carbamate are suitable corrosion inhibitors. Suitable antifoaming agents are for instance Agitan® 290 (available from Münzing, Germany), Silikon-Antischaum-Emulsion SE57 (available from Wacker Chemie, Germany) and Antimussol WLN (available from Sandoz, Switzerland).

The amount of the above listed additives is not particularly limited as long as they do not deteriorate the effect of the present invention obtained by the mixture of the ionomeric polymer and the thickener. The amount of the preservatives is about 0 to about 10 wt % based on the total amount of binder, preferably about 0.1 to 2 wt %, that of the sequestering agents is about 0 to 5 wt % based on the total amount of binder preferably about 0.005 to 0.1 wt %, that of the corrosion inhibitors is about 0 to 5 wt % based on the total amount of binder, preferably about 0.1 to 1 wt %, and the dyes are present in an amount of about 1 to 10 wt % based on the total amount of binder, preferably about 2 to 5 wt %. The amount of surfactants is about 0.001 to 0.05 wt. % based on the total amount of composition, preferably about 0.01 wt. %, and that of the antifoaming agents is about 0 to 1 wt % based on the total amount of composition, preferably about 0.001 to 0.05 wt %.

The printing plate precursor of the present invention may be produced by a method comprising providing a printing plate substrate and applying the coating composition of the present invention to the substrate. The coating composition of the present invention is applied to the substrate by usual means. The dry coating weight is preferably about 0.5 to about 3 g/m$^2$, more preferably about 1 to about 2 g/m$^2$. Although any conventional coater such as a roll coater, bar coater, wire wound rod coater and air knife coater can be used, it is preferred to use a slot coater for applying the coating composition to the substrate. When a slot coater is used, the solid content of the coating composition to be applied is preferably about 1 to about 15 wt % of the total composition, more preferably about 3 to about 8 wt %. For coaters using squeeguee rollers it is preferred that the solid content of the coating composition be about 5 to about 20 wt % based on the total composition, more preferably about 8 to about 12 wt %.

The printing plate precursors of the present invention comprise a coating comprising at least one polymer having at least one ionomeric polymer subunit and at least one high molecular weight thickening agent which shows pseudoplastic behavior. The printing plate precursors further comprise a substrate selected from the group consisting of mechanically or electrochemically grained (or a combination thereof) aluminum foil or plate, grained aluminum which was subjected to an anodizing treatment and plastic foils which may optionally be laminated to an aluminum foil.

The following examples describe the invention in more detail without limiting the invention.

EXAMPLE 1 and COMPARATIVE EXAMPLE 2

Two coating formulations were prepared as detailed in Table 1 to compare the stabilizing effect of xanthan gum on an ionically stabilized aqueous carbon dispersion.

TABLE 1

Formulation ingredients in parts by weight

| Ingredient | Example 1 | Example 2 (comparative) |
|---|---|---|
| Poly(acrylic acid) | 0.614 | 0.614 |
| Benzyltrimethylammonium hydroxide (40%) | 3.564 | 3.564 |
| CAB-O-JET 200* | 1.515 | 1.515 |
| CR-5L** | 0.204 | 0.204 |
| Xanthan gum | 0.050 | — |
| LODYNE 103A*** | 0.010 | — |
| AEROSOL OT**** | — | 0.010 |
| n-propanol | 8.530 | 8.535 |
| Water | 85.513 | 85.558 |

*CAB-O-JET 200 is an aqueous dispersion of carbon particles stabilized by sulfonate groups available from Cabot Corp.
**CR-5L is a water-soluble aliphatic epoxide available from Esprix Chemical Co.
***LODYNE 103A is a fluorosurfactant available from Ciba Specialty Chemicals.
****AEROSOL OT is a sulfosuccinate surfactant available from Cytec Industries.

The formulations in Table 1 were coated onto grained, anodized aluminum and dried. The reflective densities of both coatings were measured with an X-Rite 408 densitometer. The coating produced in Example 1 had a density of 1.04 while that of comparative Example 2 was only 0.67. The low density of the coating lacking the xanthan gum reflected the fact that the carbon particles had flocculated as the coating dried.

The printing plate prepared with the formulation detailed under Example 1 was imaged on a Creo 3244 Trendsetter at 300, 400 and 500 mJ/cm$^2$ (20W). The imaged plate was mounted directly without processing on a Miehle printing press and 2,500 prints were made using Gans Mach 1 Process Black Ink and a fountain solution formulated with Litho Etch 142W and PAR according to the manufacturer's (VARN) directions.

EXAMPLES 3–5

Three formulations were prepared as detailed in Table 2, demonstrating the beneficial effects of three commercially available viscosity modifiers (RHEOLATE 1, VISCALEX VG2 and BERMACOL E411 FQ).

TABLE 2

Formulation ingredients in parts by weight

| Ingredient | Example 3 | Example 4 | Example 5 |
|---|---|---|---|
| PLASTICRYL HV-11* | 2.457 | 2.457 | 2.457 |
| Benzyltrimethylammonium hydroxide (40%) | 3.564 | 3.564 | 3.564 |

TABLE 2-continued

Formulation ingredients in parts by weight

| Ingredient | Example 3 | Example 4 | Example 5 |
|---|---|---|---|
| CAB-O-JET 200 | 3.030 | 3.030 | 3.030 |
| CR-5L | 0.204 | 0.204 | 0.204 |
| RHEOLATE 1** | 0.167 | — | — |
| VISCALEX VG2*** | — | 0.167 | — |
| BERMACOL**** | — | — | 0.050 |
| LODYNE 103A | 0.003 | 0.003 | 0.003 |
| n-propanol | 7.291 | 7.291 | 7.291 |
| Water | 83.284 | 83.284 | 83.401 |

*PLASTICRYL HV-11 is an aqueous solution of poly(acrylic acid) available from ABCO Industries.
**RHEOLATE 1 is an aqueous acrylic emulsion available from Rheox, Inc.
***VISCALEX VG2 is an acrylic copolymer available from Ciba Specialty Chemicals.
****BERMACOL E411 FQ is a non-ionic cellulose ether available from Akzo Nobel.

The formulations in Table 2 were coated onto grained, anodized aluminum and dried. The reflective density of each coating was measured with an X-Rite 408 densitometer. The results are summarized in Table 3.

TABLE 3

Reflective density measurement of CAB-O-JET coatings

| Example 3 | Example 4 | Example 5 |
|---|---|---|
| 1.02 | 0.92 | 1.02 |

EXAMPLE 6 and COMPARATIVE EXAMPLE 7

Two formulations were prepared as detailed in Table 4 to demonstrate the stabilizing effect of xanthan gum on a polymer-grafted aqueous carbon dispersion in a system that otherwise is too low in viscosity.

TABLE 4

Formulation ingredients in parts by weight

| Ingredient | Example 6 | Example 7 (comparative) |
|---|---|---|
| Poly(acrylic acid) | 0.614 | 0.614 |
| Acrylic polymer-grafted carbon (10% in water) | 3.060 | 3.326 |
| CR-5L | 0.204 | 0.222 |
| Xanthan gum | 0.050 | — |
| LODYNE 103A | 0.010 | — |
| AEROSOL OT | — | 0.011 |
| n-propanol | 7.128 | 46.390 |
| Water | 88.934 | 49.383 |

The formulations in Table 4 were coated onto grained, anodized aluminum and dried. The reflective density of each coating was measured with an X-Rite 408 densitometer. The coating with the xanthan gum was characterized by a reflective density of 0.92, while the comparative coating without the additive had a density of only 0.59. It is believed that the viscosity of the non-neutralized poly(acrylic acid) solution was too low for even the grafted carbon to avoid flocculation in the absence of the xanthan gum.

EXAMPLES 8 and 9

A formulation was prepared as detailed in Table 5 to demonstrate the utility of the modified hydroxyethylcellulose polymers as thickening agents.

TABLE 5

Formulation ingredients in parts by weight

| Ingredient | Example 8 | Example 9 |
|---|---|---|
| PLASTICRYL HV-11* | 2.457 | 2.457 |
| Benzyltrimethylammonium hydroxide (40%) | 3.564 | 3.564 |
| CAB-O-JET 200 | 3.030 | 3.030 |
| CR-5L | 0.204 | 0.204 |
| RHEOLATE 420** | 0.340 | — |
| NATROSOL PLUS 430** | — | 0.100 |
| LODYNE 103A | 0.003 | 0.003 |
| n-propanol | 9.704 | 9.704 |
| Water | 80.698 | 80.938 |

*RHEOLATE 420 is an alkali swellable thickener available from Rheox, Inc.
**NATROSOL PLUS 430 is a hydrophobically modified hydroxyethylcellulose available from Hercules.

The two formulations in Table 5 were filtered through coarse filter paper, coated and evaluated as described for Example 1. The coating containing RHEOLATE 420 (Example 8) produced an optical density of 1.41 and the optical density of the NATROSOL PLUS 430 coating (Example 9) was found to be 1.56, both substantially higher than Comparative Example 2 which lacked the associative thickener.

EXAMPLES 10 and 11

Two formulations were prepared as detailed in Table 6.

TABLE 6

Formulation ingredients in parts by weight

| Ingredient | Example 10 | Example 11 (comparative) |
|---|---|---|
| Cationic polymer⁻* | 2.217 | 2.217 |
| NATROSOL PLUS 430 | 0.111 | — |
| FX-GE-003** | 2.217 | 2.217 |
| Bis(vinylsulfonylmethane) | 0.055 | 0.055 |
| n-propanol | 46.757 | 46.813 |
| Water | 48.643 | 48.698 |

*Poly(vinylbenzyltrimethylammonium chloride-co-N-(3-aminopropyl) methacrylamide hydrochloride) (19:1 molar ratio) prepared as described in WO 00/63025.
**15% polymer-grafted carbon dispersion in ethanol available from Nippon Shokubai.

The formulations in Table 6 were coated onto grained, anodized aluminum and dried. The reflective density of each coating was measured with an X-Rite 408 densitometer. The coating with the NATROSOL PLUS 430 was characterized by a reflective density of 1.35, while the comparative coating without the additive had a density of 1.31.

EXAMPLES 12 and 13

Two formulations were prepared as detailed in Table 7.

TABLE 7

Formulation ingredients in parts by weight

| Ingredient | Example 12 | Example 13 (comparative) |
|---|---|---|
| Cationic polymer⁻* | 2.233 | 2.233 |
| NATROSOL PLUS 430 | 0.112 | — |
| GA BLACK 12031** | 2.803 | 2.803 |

TABLE 7-continued

Formulation ingredients in parts by weight

| Ingredient | Example 12 | Example 13 (comparative) |
|---|---|---|
| Bis(vinylsulfonylmethane) | 0.056 | 0.056 |
| Methanol | 46.331 | 46.387 |
| Water | 48.465 | 48.521 |

*Poly(vinylbenzyltrimethylammonium chloride-co-N-(3-aminopropyl) methacrylamide hydrochloride) (19:1 molar ratio) prepared as described in WO 00/63025.
**24% aqueous dispersion of carbon with proprietary dispersants available from Mikuni Color.

For both formulations the carbon irreversibly agglomerated immediately upon addition of the carbon dispersion to the solution of cationic polymer.

EXAMPLES 14 and 15

Two formulations were prepared as detailed in Table 8.

TABLE 8

Formulation ingredients in parts by weight

| Ingredient | Example 14 | Example 15 (comparative) |
|---|---|---|
| PLASTICRYL HV-11 | 2.457 | 2.457 |
| Benzyltrimethylammonium hydroxide (40%) | 3.564 | 3.564 |
| RHEOLATE 1 | 0.340 | — |
| GA BLACK 12031 | 1.280 | 1.280 |
| CR-5L | 0.204 | 0.204 |
| LODYNE 103A | 0.003 | 0.003 |
| n-propanol | 9.735 | 9.745 |
| Water | 82.417 | 82.747 |

The formulations in Table 8 were coated onto grained, anodized aluminum and dried. The reflective density of each coating was measured with an X-Rite 408 densitometer. The coating with the RHEOLATE 1 was characterized by a reflective density of 1.20, while the comparative coating without the additive had a density of 0.85.

The two plates were imaged on a Creo 3230 Trendsetter at 15W laser intensity and mounted on a Miehle printing press. The plate prepared according to comparative Example 15 printed a faint image even when imaged at a dose of 500 mJ/cm². The plate prepared according to Example 14 with the pseudoplastic additive printed a full density image at an exposure of 450 mJ/cm², and even at an exposure of 350 mJ/cm² the plate provided prints of higher density than did the comparative Example 15 plate imaged at 500 mJ/cm².

It should be understood that various changes and modifications to the preferred embodiments described herein will be apparent to those skilled in the art. Such changes and modifications can be made without departing from the spirit and scope of this invention and without diminishing its attendant advantages. It is therefore intended that such changes and modifications be covered by the appended claims.

We claim:

1. A printing plate coating composition comprising
   (a) a carbon pigment dispersible in water;
   (b) at least one polymer comprising at least one ionomeric polymer subunit; and
   (c) at least one high molecular weight thickening agent which shows pseudoplastic behavior, wherein the thickening agent is a polymer selected from the group consisting of xanthan gum, hydroxyethyl cellulose, hydrophobically-modified ethoxylated polyurethane, styrene-maleic anhydride terpolymers, hydrophobically-modified alkali-swellable emulsions and mixtures thereof.

2. The coating composition of claim 1, wherein the carbon pigment is selected from the group consisting of (i) carbon functionalized with ionic groups, (ii) carbon covalently bound to a polymer, (iii) carbon dispersed through the use of a dispersant, and (iv) mixtures thereof.

3. The coating composition according to claim 1, wherein the polymer comprising at least one ionomeric polymer subunit is capable of being readily converted from a hydrophilic material to a hydrophobic one by heating or by a heat-induced reaction.

4. The coating composition according to claim 1, wherein the polymer comprising at least one ionomeric polymer subunit is represented by the structure

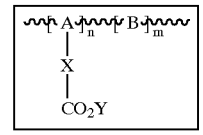

wherein "A" represents recurring units derived from ethylenically unsaturated polymerizable monomers, X is an optional spacer group, B represents non-carboxylated recurring units, Y is selected from the group consisting of a proton and a cation, m is 0 to about 75 mol %, and n is from about 25 to 100 mol %.

5. The coating composition according to claim 1, wherein the polymer comprising at least one ionomeric polymer subunit is a salt of a polymeric carboxylic acid and is represented by the structure:

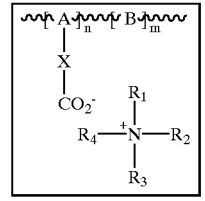

wherein "A" represents recurring units derived from ethylenically unsaturated polymerizable monomers, X is an optional spacer group, $R_1$, $R_2$, $R_3$, and $R_4$ are independently alkyl or aryl groups, or any two, three or four of $R_1$, $R_2$, $R_3$, and $R_4$ can be combined to form one or two heterocyclic rings with the charged nitrogen atom, and B represents non-carboxylated recurring units, m is 0 to about 75 mol %, and n is from about 25 to 100 mol %.

6. The coating composition according to claim 1 wherein the polymer comprising at least one ionomeric polymer subunit is represented by any of the structures:

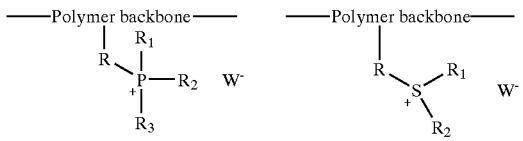

-continued

———Polymer Backbone———

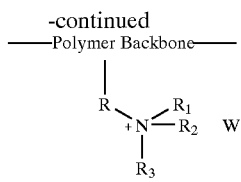

wherein R is an alkylene, arylene, or cycloalkylene group or a combination of two or more such groups, $R_1$, $R_2$ and $R_3$ are independently substituted or unsubstituted alkyl, aryl or cycloalkyl groups, or any two of $R_1$, $R_2$ and $R_3$ can be combined to form a heterocyclic ring with the charged nitrogen, phosphorous or sulfur atom, and $W^-$ is an anion.

7. The coating composition of claim 1 wherein the polymer comprising at least one ionomeric polymer subunit is represented by the structure:

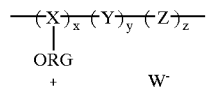

wherein ORG represents organoonium groups, X represents recurring units to which the ORG groups are attached, Y represents recurring units derived from ethylenically unsaturated polymerizable monomers that may provide active sites for crosslinking, Z represents recurring units derived from any additional ethylenically unsaturated polymerizable monomers, x is from about 50 to about 99 mol %, y is from about 1 to about 20 mol %, and z is from 0 to about 49 mol and $W^-$ is an anion.

8. The coating composition of claim 1 wherein the polymer comprising at least one ionomeric polymer subunit is selected from the group consisting of: (i) poly(methyl methacrylate-co-2-trimethylammoniummethyl methacrylic chloride-co-N-(3-aminopropyl) methacrylamide hydrochloride); (ii) poly(methyl methacrylate-co-2-trimethylammoniummethyl methacrylic acetate-co-N-(3-aminopropyl) methacrylamide); (iii) poly(methyl methacrylate-co-2-trimethylammoniummethyl methacrylic fluoride-co-N-(3-aminopropyl) methacrylamide hydrochloride); (iv) polyvinylbenzyl trimethylammoniumchloride-co-N-(3-aminopropyl) methacrylamide hydrochloride; (v) poly (vinylbenzyltrimethylphosphonium acetate-co-N-(3-aminopropyl) methacrylamide hydrochloride); (vi) poly (dimethyl-2-(methacryloyloxy) ethylsulfonium chloride-co-N-(3-aminopropyl)methacrylamide hydrochloride; (vii) poly(vinylbenzyldimethylsulfonium methylsulfate), (viii) poly(vinylbenzyl-dimethylsulfonium chloride), and mixtures thereof.

9. The coating composition of claim 1 wherein the polymer comprising at least one ionomeric polymer subunit is represented by the structure:

———Polymer Backbone———

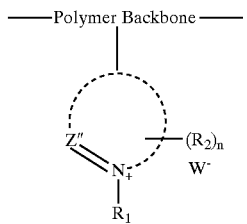

wherein $R_1$ is an alkyl group, $R_2$ is an alkyl group, an alkoxy group, an aryl group, an alkenyl group, halo, a cycloalkyl group, or a heterocyclic group having 5 to 8 atoms in the ring, $Z''$ represents the carbon and nitrogen, oxygen, or sulfur atoms necessary to complete an aromatic N-heterocyclic ring having 5 to 10 atoms in the ring, n is 0 to 6, and $W^-$ is an anion.

10. The coating composition of claim 1 wherein the polymer comprising at least one ionomeric polymer subunit is represented by the structure:

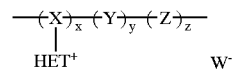

wherein $HET^+$ represents a positively-charged, pendant N-alkylated aromatic heterocyclic group, X represents recurring units having attached $HET^+$ groups, Y represents recurring units derived from ethylenically unsaturated polymerizable monomers that provide active crosslinking sites, Z represents recurring units for additional ethylenically unsaturated monomers, x is from about 20 to 100 mol %, y is from 0 to about 20 mol %, z is from 0 to about 80 mol %, and $W''$ is an anion.

11. The coating composition of claim 1 wherein the polymer comprising at least one ionomeric polymer subunit is selected from the group consisting of a polyester, polyamide, polyamide-ester, polyarylene oxide or a derivative thereof, polyurethane, polyxylylene or a derivative thereof, a poly(phenylene sulfide) ionomer, polyarylene oxide, and a silicon-based sol gel.

12. The coating composition of claim 1 wherein the polymer comprising at least one ionomeric polymer subunit is a polymer comprising recurring organoonium moieties and the organoonium moiety is a pendant quaternary ammonium group on the backbone of the polymer.

13. The coating composition according to claim 1 wherein the amount of the polymer comprising at least one ionomeric polymer subunit is about 0.2 to about 20 wt % based on the total coating composition.

14. The coating composition according to claim 1 wherein the solid content of the composition is about 1 to about 15 wt % of the total composition.

15. A printing plate precursor comprising:
  (a) a printing plate substrate; and
  (b) a coating composition applied to the substrate, wherein the coating composition comprises:
    (i) a carbon pigment dispersible in water,
    (ii) at least one polymer comprising at least one ionomeric polymer subunit, and
    (iii) at least one high molecular weight thickening agent which shows pseudoplastic behavior, wherein the thickening agent is a polymer selected from the group consisting of xanthan gum, hydroxyethyl cellulose, hydrophobically-modified ethoxylated polyurethane, styrene-maleic anhydride terpolymers, hydrophobically-modified alkali-swellable emulsions and mixtures thereof.

16. The printing plate precursor of claim 15, wherein the carbon pigment dispersible in water is selected from the group consisting of (i) carbon functionalized with ionic groups, (ii) carbon covalently bound to a polymer, (iii) carbon dispersed through the use of a dispersant, and (iv) mixtures thereof.

17. The printing plate precursor according to claim 15, wherein the polymer comprising at least one ionomeric polymer subunit is capable of being readily converted from a hydrophilic material to a hydrophobic one by heating or by a heat-induced reaction.

18. The printing plate precursor according to claim 15, wherein the polymer comprising at least one ionomeric polymer subunit is represented by the structure

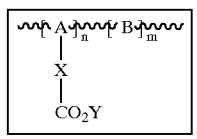

wherein "A" represents recurring units derived from ethylenically unsaturated polymerizable monomers, X is an optional spacer group, B represents non-carboxylated recurring units, Y is selected from the group consisting of a proton and a cation, m is 0 to about 75 mol %, and n is from about 25 to 100 mol %.

19. The printing plate precursor according to claim 15, wherein the polymer comprising at least one ionomeric polymer subunit is a salt of a polymeric carboxylic acid and is represented by the structure:

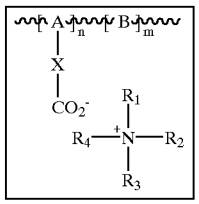

wherein "A" represents recurring units derived from ethylenically unsaturated polymerizable monomers, X is an optional spacer group, $R_1$, $R_2$, $R_3$, and $R_4$ are independently alkyl or aryl groups, or any two, three or four of $R_1$, $R_2$, $R_3$, and $R_4$ can be combined to form one or two heterocyclic rings with the charged nitrogen atom, and B represents non-carboxylated recurring units, m is 0 to about 75 mol %, and n is from about 25 to 100 mol %.

20. The printing plate precursor according to claim 15 wherein the polymer comprising at least one ionomeric polymer subunit is represented by any of the structures:

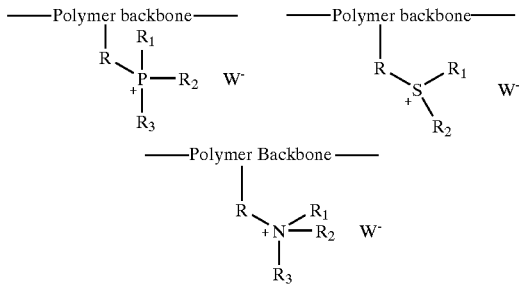

wherein R is an alkylene, arylene, or cycloalkylene group or a combination of two or more such groups, $R_1$, $R_2$ and $R_3$ are independently substituted or unsubstituted alkyl, aryl or cycloalkyl groups, or any two of $R_1$, $R_2$ and $R_3$ can be combined to form a heterocyclic ring with the charged nitrogen, phosphorus or sulfur atom, and $W^-$ is an anion.

21. The printing plate precursor according to claim 15 wherein the polymer comprising at least one ionomeric polymer subunit is represented by the structure:

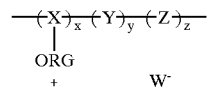

wherein ORG represents organoonium groups, X represents recurring units to which the ORG groups are attached, Y represents recurring units derived from ethylenically unsaturated polymerizable monomers that may provide active sites for crosslinking, Z represents recurring units derived from any additional ethylenically unsaturated polymerizable monomers, x is from about 50 to about 99 mol %, y is from about 1 to about 20 mol %, and z is from 0 to about 49 mol and $W^-$ is an anion.

22. The printing plate precursor according to claim 15 wherein the polymer comprising at least one ionomeric polymer subunit is selected from the group consisting of: (i) poly(methyl methacrylate-co-2-trimethylammoniummethyl methacrylic chloride-co-N-(3-aminopropyl) methacrylamide hydrochloride); (ii) poly(methyl methacrylate-co-2-trimethylammoniummethyl methacrylic acetate-co-N-(3-aminopropyl) methacrylamide); (iii) poly(methyl methacrylate-co-2-trimethylammoniummethyl methacrylic fluoride-co-N-(3-aminopropyl) methacrylamide hydrochloride); (iv) polyvinylbenzyl trimethylammoniumchloride-co-N-(3-aminopropyl) methacrylamide hydrochloride; (v) poly (vinylbenzyltrimethylphosphonium acetate-co-N-(3-aminopropyl) methacrylamide hydrochloride); (vi) poly (dimethyl-2-(methacryloyloxy) ethylsulfonium chloride-co-N-(3-aminopropyl)methacrylamide hydrochloride; (vii) poly(vinylbenzyl-dimethylsulfonium methylsulfate), (viii) poly(vinylbenzyl-dimethylsulfonium chloride, and mixtures thereof.

23. The printing plate precursor according to claim 15 wherein the polymer comprising at least one ionomeric polymer subunit is represented by the structure:

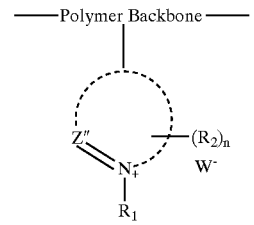

wherein $R_1$ is an alkyl group, $R_2$ is an alkyl group, an alkoxy group, an aryl group, an alkenyl group, halo, a cycloalkyl group, or a heterocyclic group having 5 to 8 atoms in the ring, $Z''$ represents the carbon and nitrogen, oxygen, or sulfur atoms necessary to complete an aromatic N-heterocyclic ring having 5 to 10 atoms in the ring, n is 0 to 6 and $W^-$ is an anion.

24. The printing plate precursor according to claim 15 wherein the polymer comprising at least one ionomeric polymer subunit is represented by the structure:

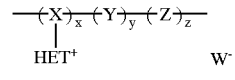

wherein $HET^+$ represents a positively-charged, pendant N-alkylated aromatic heterocyclic group, X represents recurring units having attached $HET^+$ groups, Y represents recurring units derived from ethylenically unsaturated polymerizable monomers that provide active crosslinking sites, Z represents recurring units for additional ethylenically unsaturated monomers, x is from about 20 to 100 mol %, y is from 0 to about 20 mol %, z is from 0 to about 80 mol %, and W⁻ is an anion.

25. The printing plate precursor according to claim 15 wherein the polymer comprising at least one ionomeric polymer subunit is selected from the group consisting of a polyester, polyamide, polyamide-ester polyarylene oxide or a derivative thereof, polyurethane, polyxylylene or a derivative thereof, a poly(phenylene sulfide) ionomer, polyarylene oxide, and a silicon-based sol gel.

26. The printing plate precursor according to claim 15 wherein the polymer comprising at least one ionomeric polymer subunit is a polymer comprising recurring organoonium moieties and the organoonium moiety is a pendant quaternary ammonium group on the backbone of the polymer.

27. The printing plate precursor according to claim 15 wherein the dry coating weight is about 0.5 to about 3 g/m².

28. A method for producing a printing plate precursor comprising:
    (a) providing a printing plate substrate; and
    (b) applying a coating composition to the substrate, wherein the composition comprises
       (i) a carbon pigment dispersible in water,
       (ii) at least one polymer comprising at least one ionomeric polymer subunit, and
       (iii) at least one high molecular weight thickening agent which shows pseudoplastic behavior, wherein the thickening agent is a polymer selected from the group consisting of xanthan gum, hydroxyethyl cellulose, hydrophobically-modified ethoxylated polyurethane, styrene-maleic anhydride terpolymers, hydrophobically-modified alkali-swellable emulsions and mixtures thereof.

29. The method of claim 28, wherein the carbon pigment dispersible in water is selected from the group consisting of (i) carbon functionalized with ionic groups, (ii) carbon covalently bound to a polymer, (iii) carbon dispersed through the use of a dispersant, and (iv) mixtures thereof.

30. The method of claim 28, wherein the polymer comprising at least one ionomeric polymer subunit is capable of being readily converted from a hydrophilic material to a hydrophobic one by heating or by a heat-induced reaction.

31. The method of claim 28, wherein the polymer comprising at least one ionomeric polymer subunit is represented by the structure

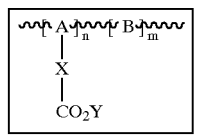

wherein "A" represents recurring units derived from ethylenically unsaturated polymerizable monomers, X is an optional spacer group, B represents non-carboxylated recurring units, Y is selected from the group consisting of a proton and a cation, m is 0 to about 75 mol %, and n is from about 25 to 100 mol %.

32. The method of claim 28, wherein the polymer comprising at least one ionomeric polymer subunit is a salt of a polymeric carboxylic acid and is represented by the structure:

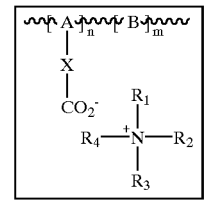

wherein "A" represents recurring units derived from ethylenically unsaturated polymerizable monomers, X is an optional spacer group, $R_1$, $R_2$, $R_3$, and $R_4$ are independently alkyl or aryl groups, or any two, three or four of $R_1$, $R_2$, $R_3$, and $R_4$ can be combined to form one or two heterocyclic rings with the charged nitrogen atom, and B represents non-carboxylated recurring units, m is 0 to about 75 mol %, and n is from about 25 to 100 mol %.

33. The method of claim 28 wherein the polymer comprising at least one ionomeric polymer subunit is represented by any of the structures:

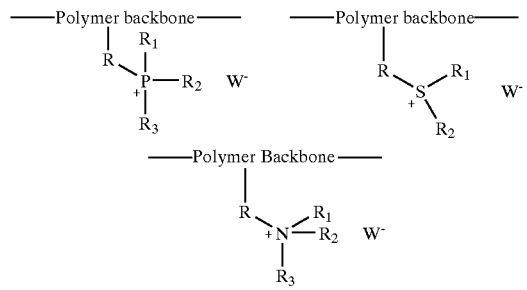

wherein R is an alkylene, arylene, or cycloalkylene group or a combination of two or more such groups, $R_1$, $R_2$ and $R_3$ are independently substituted or unsubstituted alkyl, aryl or cycloalkyl groups, or any two of $R_1$, $R_2$ and $R_3$ can be combined to form a heterocyclic ring with the charged nitrogen, phosphorus or sulfur atom, and W⁻ is an anion.

34. The method according to claim 28 wherein the polymer comprising at least one ionomeric polymer subunit is represented by the structure:

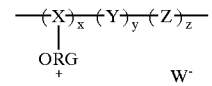

wherein ORG represents organoonium groups, X represents recurring units to which the ORG groups are attached, Y represents recurring units derived from ethylenically unsaturated polymerizable monomers that may provide active sites for crosslinking, Z represents recurring units derived from any additional ethylenically unsaturated polymenzable monomers, x is from about 50 to about 99 mol %, y is from about 1 to about 20 mol %, and z is from 0 to about 49 mol and W⁻ is an anion.

35. The method according to claim 28 wherein the polymer comprising at least one ionomeric polymer subunit is at selected from the group consisting of (i) poly(methyl methacrylate-co-2-trimethylammoniummethyl methacrylic chloride co-N-(3-aminopropyl) methacrylamide hydrochloride); (ii) poly(methyl methacrylate-co-2-trimethylammoniummethyl methacrylic acetate-co-N-(3-aminopropyl) methacrylamide); (iii) poly(methyl methacrylate-co-2-trimethylammoniummethyl methacrylic fluoride-co-N-(3-aminopropyl) methacrylamide hydrochloride); (iv) polyvinylbenzyl trimethylammoniumchloride-co-N-(3-aminopropyl) methacrylamide hydrochloride; (v) poly (vinylbenzyltrimethylphosphonium acetate-co-N-(3-aminopropyl) methacrylamide hydrochloride); (vi) poly (dimethyl-2-(methacryloyloxy) ethylsulfonium chloride-co-N-(3-aminopropyl)methacrylamide hydrochloride; (vii) poly(vinylbenzyldimethylsulfonium methylsulfate), (viii) poly(vinylbenzyl-dimethylsulfonium chloride), and mixtures thereof.

36. The method according to claim 28 wherein the polymer comprising at least one ionomeric polymer subunit is represented by the structure:

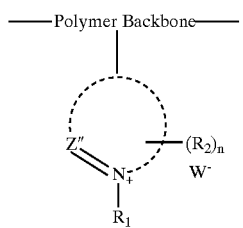

wherein $R_1$ is an alkyl group, $R_2$ is an alkyl group, an alkoxy group, an aryl group, an alkenyl group, halo, a cycloalkyl group, or a heterocyclic group having 5 to 8 atoms in the ring, Z" represents the carbon and nitrogen, oxygen, or sulfur atoms necessary to complete an aromatic N-heterocyclic ring having 5 to 10 atoms in the ring, n is 0 to 6, and $W^-$ is an anion.

37. The method according to claim 28 wherein the polymer comprising at least one ionomeric polymer subunit is represented by the structure:

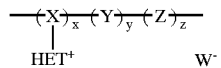

wherein $HET^+$ represents a positively-charged, pendant N-alkylated aromatic heterocyclic group, X represents recurring units having attached $HET^+$ groups, Y represents recurring units derived from ethylenically unsaturated polymerizable monomers that provide active crosslinking sites, Z represents recurring units for additional ethylenically unsaturated monomers, x is from about 20 to 100 mol %, y is from 0 to about 20 mol %, z is from 0 to about 80 mol %, and $W^-$ is an anion.

38. The method according to claim 28 wherein the polymer comprising at least one ionomeric polymer subunit is selected from the group consisting of a polyester, polyamide, polyamide-ester, polyarylene oxide or a derivative thereof, polyurethane, polyxylylene or a derivative thereof, a poly (phenylene sulfide) ionomer, polyarylene oxide, and a silicon-based sol gel.

39. The method of claim 28, wherein the amount of the polymer comprising at least one ionomeric polymer subunit is about 0.2 to about 20 wt % based on the total coating composition.

40. The method of claim 28, wherein the solid content of the coating composition is about 1 to about 15 wt % of the total composition.

41. A printing plate coating composition comprising
(a) a carbon pigment dispersible in water;
(b) at least one polymer comprising at least one ionomeric polymer subunit, wherein the polymer comprising at least one ionomeric polymer subunit is represented by the structure

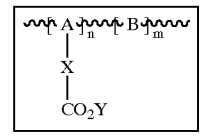

wherein "A" represents recurring units derived from ethylenically unsaturated polymerizable monomers, X is an optional spacer group, B represents non-carboxylated recurring units, Y is selected from the group consisting of a proton and a cation, m is 0 to about 75 mol %, and n is from about 25 to 100 mol %.; and (c) at least one high molecular weight thickening agent which shows pseudoplastic behavior.

42. The coating composition of claim 41, wherein the carbon pigment is selected from the group consisting of (i) carbon functionalized with ionic groups, (ii) carbon covalently bound to a polymer, (iii) carbon dispersed through the use of a dispersant, and (iv) mixtures thereof.

43. The coating composition according to claim 41, wherein the polymer comprising at least one ionomeric polymer subunit is capable of being readily converted from a hydrophilic material into a hydrophobic material by heating or by a heat-induced reaction.

44. The coating composition according to claim 41, wherein the polymer comprising at least one ionomeric polymer subunit further comprises a salt of a polymeric carboxylic acid represented by the structure:

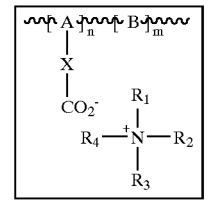

wherein "A" represents recurring units derived from ethylenically unsaturated polymerizable monomers, X is an optional spacer group, $R_1$, $R_2$, $R_3$, and $R_4$ are independently alkyl or aryl groups, or any two, three or four of $R_1$, $R_2$, $R_3$, and $R_4$ can be combined to form one or two heterocyclic rings with the charged nitrogen atom, and B represents non-carboxylated recurring units, m is 0 to about 75 mol %, and n is from about 25 to 100 mol %.

45. The coating composition according to claim 41 wherein the amount of the polymer comprising at least one ionomeric polymer subunit is about 0.2 to about 20 wt % based on the total coating composition.

46. The coating composition according to claim 41 wherein the solid content of the composition is about 1 to about 15 wt % of the total composition.

47. A printing plate precursor comprising:
(a) a printing plate substrate; and
(b) a coating composition applied to the substrate, wherein the coating composition comprises:
(i) a carbon pigment dispersible in water,
(ii) at least one polymer comprising at least one ionomeric polymer subunit, wherein the polymer comprising at least one ionomeric polymer subunit is represented by the structure

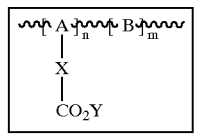

wherein "A" represents recurring units derived from ethylenically unsaturated polymerizable monomers, X is an optional spacer group, B represents non-carboxylated recurring units, Y is selected from the group consisting of a proton and a cation, m is 0 to about 75 mol %, and n is from about 25 to 100 mol %., and (iii) at least one high molecular weight thickening agent which shows pseudoplastic behavior.

48. A method for producing a printing plate precursor comprising:

(a) providing a printing plate substrate; and (b) applying a coating composition to the substrate, wherein the composition comprises (i) a carbon pigment dispersible in water, (ii) at least one polymer comprising at least one ionomeric polymer subunit, wherein the polymer comprising at least one ionomeric polymer subunit is represented by the structure

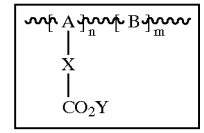

wherein "A" represents recurring units derived from exhylenically unsaturated polymerizable monomers, X is an optional spacer group, B represents non-carboxylated recurring units, Y is selected from the group consisting of a proton and a cation, m is 0 to about 75 mol %, and n is from about 25 to 100 mol %, and (iii) at least one high molecular weight thickening agent which shows pseudoplastic behavior.

* * * * *